United States Patent
Snively et al.

(10) Patent No.: US 8,532,119 B2
(45) Date of Patent: Sep. 10, 2013

(54) INTERFABRIC ROUTING HEADER FOR USE WITH A BACKBONE FABRIC

(75) Inventors: Robert Norman Snively, Morgan Hill, CA (US); Steven L. Wilson, Los Gatos, CA (US); Edward D. McClanahan, Pleasanton, CA (US); Dennis Hideo Makishima, Mountain View, CA (US); Daniel Ji Yong Park Chung, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1884 days.

(21) Appl. No.: 10/903,899

(22) Filed: Jul. 30, 2004

(65) Prior Publication Data

US 2006/0023708 A1 Feb. 2, 2006

(51) Int. Cl.
*H04L 12/28* (2006.01)
*H04J 3/16* (2006.01)
*G06F 15/16* (2006.01)

(52) U.S. Cl.
USPC ........... 370/401; 370/389; 370/392; 370/402; 370/404; 370/466; 709/236

(58) Field of Classification Search
None
See application file for complete search history.

(56) References Cited

U.S. PATENT DOCUMENTS

| | | | |
|---|---|---|---|
| 6,269,404 B1 | 7/2001 | Hart et al. | 709/238 |
| 6,285,276 B1 | 9/2001 | Nedele et al. | 358/160 |
| 6,339,842 B1 | 1/2002 | Fernandez et al. | 725/133 |
| 6,401,128 B1 | 6/2002 | Stai et al. | 709/236 |
| 7,130,303 B2* | 10/2006 | Hadzic | 370/389 |
| 7,206,288 B2 | 4/2007 | Cometto et al. | 370/249 |
| 7,292,567 B2* | 11/2007 | Terrell et al. | 370/363 |
| 2002/0013848 A1* | 1/2002 | Rene Salle | 709/226 |
| 2002/0101859 A1 | 8/2002 | Maclean | 370/352 |
| 2002/0110125 A1 | 8/2002 | Banks et al. | 370/392 |
| 2002/0114328 A1 | 8/2002 | Mijamoto et al. | 370/389 |
| 2002/0141424 A1* | 10/2002 | Gasbarro et al. | 370/412 |
| 2002/0163910 A1 | 11/2002 | Wisner et al. | 370/389 |
| 2002/0165978 A1 | 11/2002 | Chui | 709/238 |
| 2002/0191602 A1 | 12/2002 | Woodring et al. | 370/389 |
| 2003/0012204 A1* | 1/2003 | Czeiger et al. | 370/401 |
| 2003/0030866 A1* | 2/2003 | Yoo | 359/128 |

(Continued)

OTHER PUBLICATIONS

Weber et al.; "Fibre Channel (FC) Frame Encapsulation;" Dec. 2003; The Internet Society.

(Continued)

*Primary Examiner* — Ayaz Sheikh
*Assistant Examiner* — Sori Aga
(74) *Attorney, Agent, or Firm* — Wong, Cabello, Lutsch, Rutherford & Brucculeri, L.L.P.

(57) ABSTRACT

A Fiber Channel router used to join fabrics. EX_ports are used to connect to the fabrics. The EX_port joins the fabric but the router will not merge into the fabric. Ports in the Fiber Channel router can be in a fabric, but other ports can be connected to other fabrics. Fiber Channel routers can be interconnected using a backbone fabric. Global, interfabric and encapsulation headers are developed to allow routing by conventional Fiber Channel switch devices in the backbone fabric and simplify Fiber Channel router routing. Phantom domains and devices must be developed for each of the fabrics being interconnected. Front phantom domains are present at each port directly connected to a fabric. Each of these is then connected to at least one translate phantom domain. Zoning is accomplished by use of a special LSAN zoning naming convention. This allows each administrator to independently define devices are accessible.

10 Claims, 21 Drawing Sheets

(56) References Cited

U.S. PATENT DOCUMENTS

| | | | |
|---|---|---|---|
| 2003/0118053 A1 | 6/2003 | Edsall et al. | 370/474 |
| 2003/0158971 A1 | 8/2003 | Renganarayanan et al. | 709/248 |
| 2004/0024911 A1 | 2/2004 | Chung et al. | 709/249 |
| 2005/0025075 A1 | 2/2005 | Dutt et al. | 370/299 |
| 2005/0036499 A1 | 2/2005 | Dutt et al. | 370/401 |
| 2005/0053073 A1* | 3/2005 | Kloth et al. | 370/395.41 |
| 2005/0073956 A1* | 4/2005 | Moores et al. | 370/235 |
| 2005/0198523 A1 | 9/2005 | Shanbhag et al. | 713/200 |
| 2006/0023708 A1 | 2/2006 | Snively et al. | 370/389 |
| 2006/0023725 A1 | 2/2006 | Makishima et al. | 370/398 |
| 2006/0023726 A1 | 2/2006 | Chung et al. | 370/398 |
| 2006/0023751 A1 | 2/2006 | Wilson et al. | 370/474 |
| 2006/0034302 A1 | 2/2006 | Peterson | 370/401 |

OTHER PUBLICATIONS

"Fabric Extension Study Group;" Draft Minutes; T11/04-129V0.

Pelissier et al.; "FR_Header Definition;" T11/04-241v0; Apr. 2004.

"Frame Routing Extended Header (FR_Header);" T11/05-214v0; Revision 3; Mar. 15, 2005.

"Inter-Fabric Routing Extended Header (IFR_Header);" T11/05-214v1; Revision 5d; May 20, 2005.

Pelissier et al.; "Inter-Fabric Routing;" T11/04-520v0; Jul. 30, 2004.

DeSanti et al.; "Inter-Fabric Routing;" T11/04-408v0; Jun. 2004.

"Transport Fabric Model;" T11/05-075v1; Rev. 1.3; Apr. 1, 2005.

Pelissier et al.; "Inter-Fabric Routing Solutions;" 05-232v1; Apr. 5, 2005.

"Fabric Routing Types;" T11/05-099v0; Feb. 1, 2005.

"Fibre Channel Backbone (FC-BB);" Rev 4.7; NCITS working draft proposed American National Standard for Information Systems; Jun. 8, 2000.

"Fibre Channel Backbone (FC-BB-2);" Rev 6.0; INCITS working draft proposed American National Standard for Information Systems; Feb. 4, 2003.

"Fibre Channel Switch Fabric—2 (FC-SW-2);" Rev 5.3; NCITS working draft proposed American National Standard for Information Technology; Jun. 26, 2001.

Travostino et al.; "IFCP—A Protocol for Internet Fibre Channel Networking;" Dec. 2002; 208 pages.

Rajagopal et al.; "IP and ARP over Fibre Channel;" Network Working Group Request for Comments: 2625; Gadzoox Networks; Jun. 1999; 127 pages.

* cited by examiner

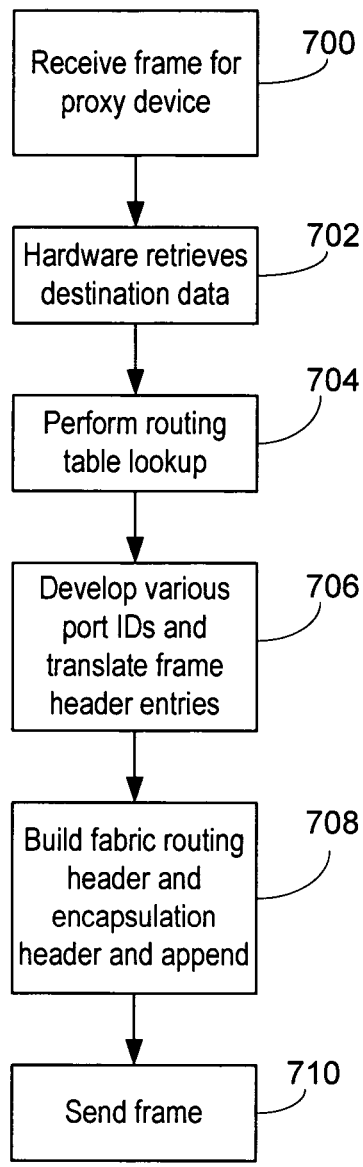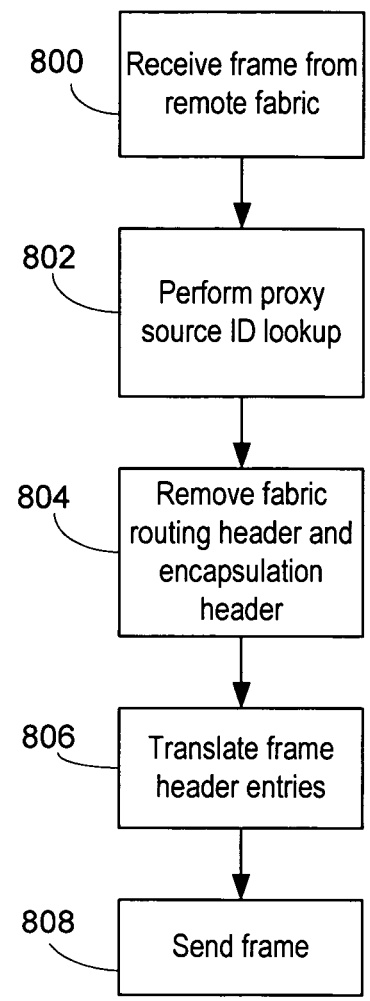
Fig. 15
Fig. 16

INTERFABRIC ROUTING HEADER FOR USE WITH A BACKBONE FABRIC

CROSS-REFERENCE TO RELATED APPLICATIONS

This application is also related to U.S. patent application Ser. Nos. 10/903,877, entitled "Multifabric Zone Device Import and Export," by Daniel Chung and Dennis Makishima; 10/903,417, entitled "Multifabric Communication Using a Backbone Fabric," by Dennis Makishima and Daniel Chung; 10/909,277, entitled "Multifabric Global Header," by Steve Wilson, Robert Snively, Ed McClanahan, Dennis Makishima and Daniel Chung; 10/903,499, entitled "System and Method for Providing Proxy and Translation Domains in a Fibre Channel Router," by Dennis Makishima and Daniel Chung, all filed concurrently herewith and hereby incorporated by reference.

This application is also related to U.S. patent application Ser. No. 10/356,392, entitled "Method and Apparatus for Routing Between Fibre Channel Fabrics," by Chris Del Signore, Vineet Abraham, Sathish Gnanasekaran, Pranab Patnaik, Vincent W. Guan, and Balakumar N. Kaushik, filed on Jan. 31, 2003, which is hereby incorporated by reference.

BACKGROUND OF THE INVENTION

1. Field of the Invention

The invention generally relates to storage area networking, and more particularly to interconnecting multiple fabrics in a storage area network.

2. Description of the Related Art

Storage area networks (SANs) are used to allow multiple hosts to connect to multiple storage devices in most applications. This allows sharing of expensive storage resources. Typically storage area networks are developed using Fibre Channel switches. Often a storage area network is used if a particular application needs the SAN capabilities, so a small isolated SAN is developed. In many cases, a different department or application will need a SAN and will have one developed for it as well. As this progresses, multiple isolated SANs are developed. However, it would be desirable to have connectivity between these isolated SAN to provide overall management and even better use of the various resources but still maintain the fabrics as separate.

In an alternate scenario, a very large Fibre Channel fabric has developed. As a Fibre Channel fabric grows in size, its stability may be reduced when an event occurs. In addition, if the fabric is formed of various types of devices, it is also significantly harder to manage these devices so that the fabric is maintained and does not fragment. Therefore, in a large fabric case it would be desirable in many instances to split the large fabric into multiple fabrics, each a smaller size, but still allow connectivity.

However, connecting fabrics in a Fibre Channel environment is not readily performed. If a conventional switch were to be connected, it would just extend the fabric, which does not accomplish the goal of connecting fabrics. Therefore it is desirable to have a device which can connect multiple fabrics without the fabrics being required to merge. This device preferably allows full speed operation between particular fabrics and can be used on simple or large environments.

SUMMARY OF THE INVENTION

A Fibre Channel router according to the present invention can be used to join isolated Fibre Channel fabrics to allow greater interconnection of devices and overall improved manageability of the entire network. In a first embodiment the Fibre Channel router contains EX_ports to connect to each of the existing fabrics. The EX_port is a new port developed to have the port join the fabric but not to have the router itself merge into the fabric. Thus the Fibre Channel router can have ports that are members of multiple fabrics. The Fibre Channel router will translate addresses between the particular fabrics so that devices in the different fabrics can communicate.

In a second embodiment ports in the Fibre Channel router can be included in a fabric as in a conventional switch, but other ports can be connected to other fabrics. In this embodiment some of the ports of the Fibre Channel router act as conventional switch ports, whereas other ports act as interconnection or EX_ports.

In a third variation a plurality of the Fibre Channel routers according to the present invention can be interconnected using a backbone fabric. In this case the Fibre Channel routers have conventional E_port connections through the backbone fabric to other Fibre Channel routers. The connections of the Fibre Channel routers to the fabrics of interest are done with EX_ports as before. To aid in a routing frames through the backbone fabric, interfabric headers and encapsulation headers are developed to allow routing by conventional Fibre Channel switch devices in the backbone fabric.

One complexity arises because phantom or proxy domains and devices must be developed for each of the fabrics being interconnected, so that the devices on a particular fabric are not aware of the various translations which must occur. To this end, each Fibre Channel router has at least two domains that it develops. A first set of domains is the front phantom domains. These are domains present at each port directly connected to a fabric. Each of these front phantom domains is then connected to at least one translate phantom domain, there being one translate phantom domain for each particular fabric to which devices being translated are connected. The use of the front phantom domains for each connected port and a translate phantom domain for each connected fabric simplifies overall routing operations and provides redundancy and simplification of the software required.

In a final embodiment, two fabrics can be joined by having a Fibre Channel router connected to each fabric and the Fibre Channel routers interconnected. In this embodiment the Fibre Channel routers then perform the necessary isolation between the particular connected fabrics.

BRIEF DESCRIPTION OF THE DRAWINGS

FIG. 15 is a flowchart of the operation steps of a port processor of FIG. 12 operating as an EX_port.

FIG. 16 is a flow chart illustration of a port processor of FIG. 12 operating as an NR_port.

DETAILED DESCRIPTION OF THE PREFERRED EMBODIMENTS

Figure 1:
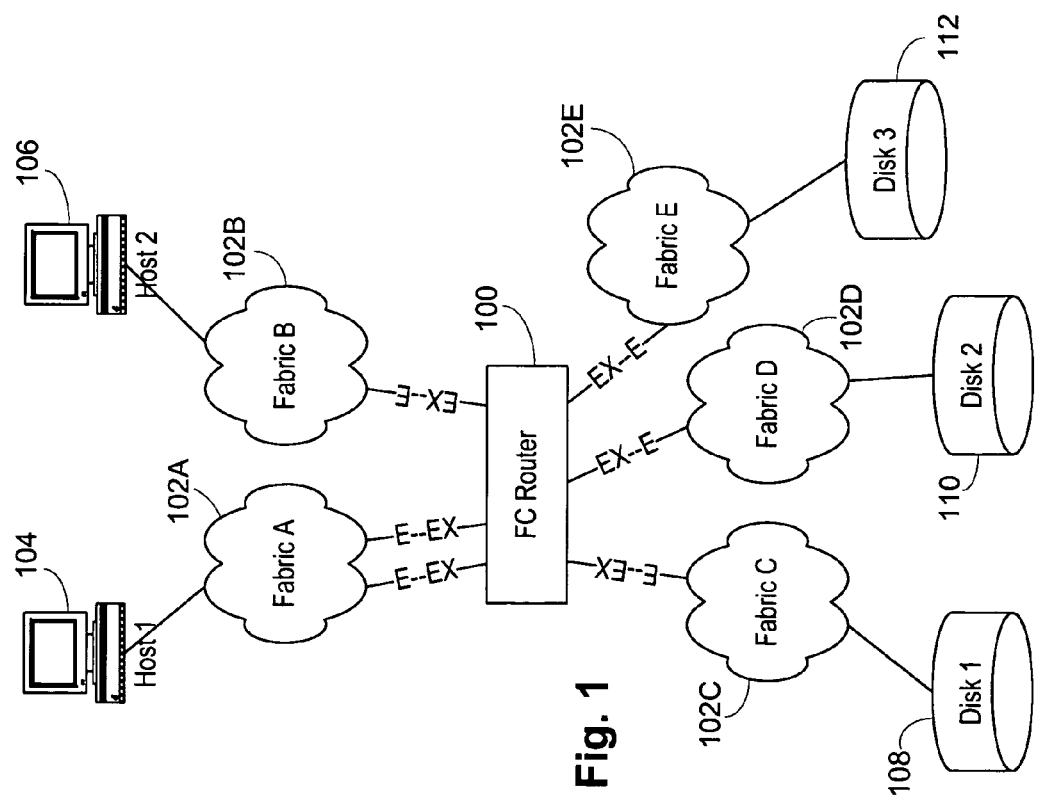
FIG. 1 is a block diagram of a series of isolated fabrics interconnected by a Fibre Channel router according to the present invention.

Referring now to FIG. 1, a Fibre Channel router 100 according to the present invention connected to a series of fabrics A-E 102A-102E by a series of links where a switch in each of the fabrics A-E 102A-102E has an E_port connected to an EX_port of the Fibre Channel router 100. An EX_port is, in great respects, an E_port but it does not cause the merger of the remainder of the Fibre Channel router 100 with the connected edge fabric 102. A host 104 is connected to fabric A 102 A, while a host 106 is connected to a fabric B 102 B. Similarly, storage devices 108, 110 and 112 are connected to fabrics C-E 102C-102E.

Figure 2:
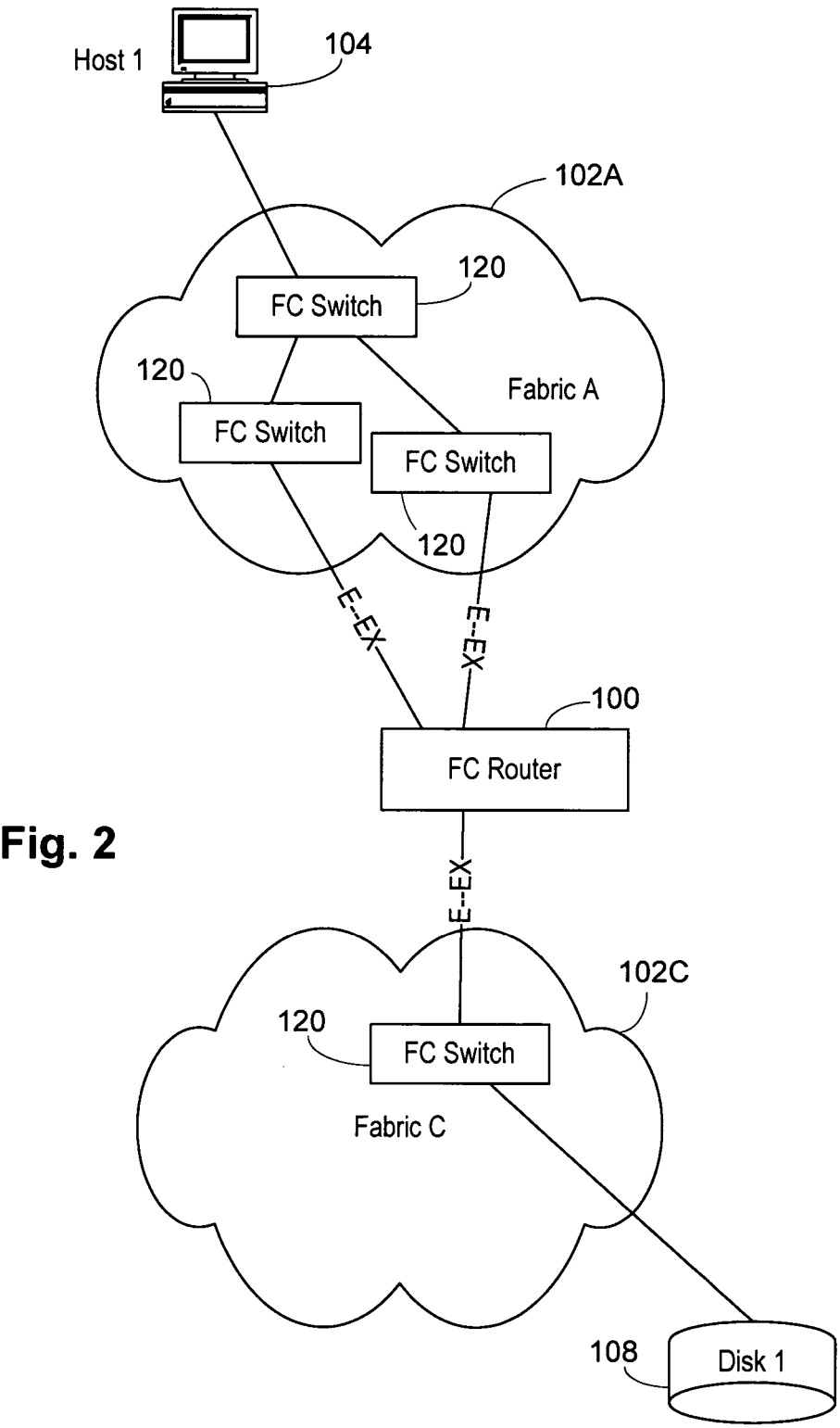
FIG. 2 is a more detailed block diagram of isolated fabrics being interconnected by a Fibre Channel router according to the present invention.

Referring then to FIG. 2, it can be seen that the fabric A 102A includes a series of Fibre Channel switches 120 which are interconnected to connect to the host 104 and have multiple connections to the Fibre Channel router 100. In the second fabric C 102C, the storage device 108 is connected to a single Fibre Channel switch 120, which has a single link to the Fibre Channel router 100.

Figure 3:
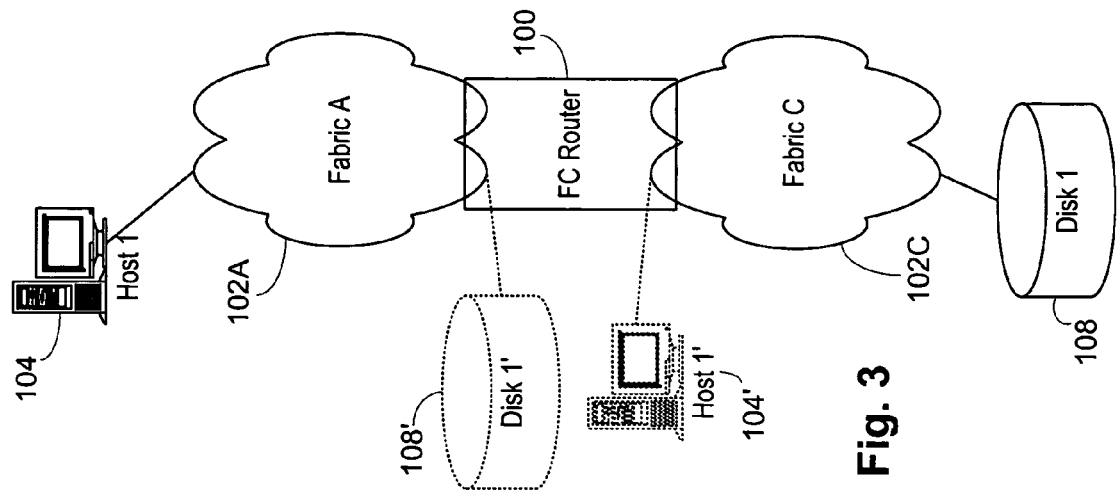
FIG. 3 illustrates the phantom or proxy devices developed by a Fibre Channel router according to the present convention when interconnecting two fabrics.

In FIG. 3 the Fibre Channel router 100 is connected to the fabric A 102A and the fabric C 102C. Host 104 is connected to fabric A 102A but due to the operation of the Fibre Channel router 100 appears as host 104' connected to fabric C 102C. The storage device 108 connected to fabric C 102C is presented by the Fibre Channel router 100 on fabric A 102A. Thus host 104 would address storage device 108', and storage device 108 would address host 104'. The Fibre Channel router 100 would handle translating addresses between the particular devices as necessary, as will be described in more detail below.

Figure 4:
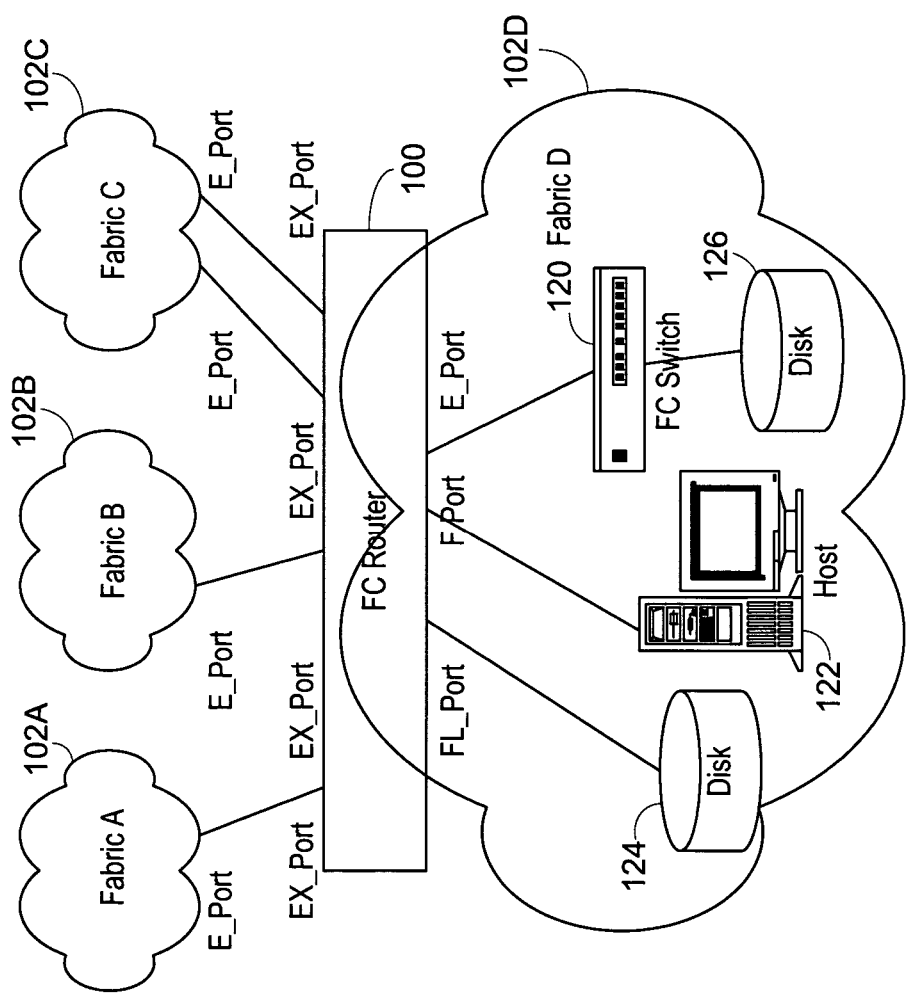
FIG. 4 is a block diagram of a Fibre Channel router according to the present invention interconnecting a series of fabrics and acting as a Fibre Channel switch in a fabric.

In an alternate embodiment illustrated in FIG. 4, the Fibre Channel router 100 can be connected to a series of fabrics A, B and C 102 A. The Fibre Channel router 100 also acts as a conventional Fibre Channel switch in a fabric D 102D. In this case the Fibre Channel router 100 connects to another Fibre Channel switch 120, which in turn could be connected to a storage device 126. Similarly, a host 122 could be directly connected to the Fibre Channel router 100 through an F_port and a storage device 124 could be connected through an FL_port. Thus in the preferred embodiments the Fibre Channel router 100 is a flexible device which can both interconnect fabrics and act as a conventional switch.

Figure 5:
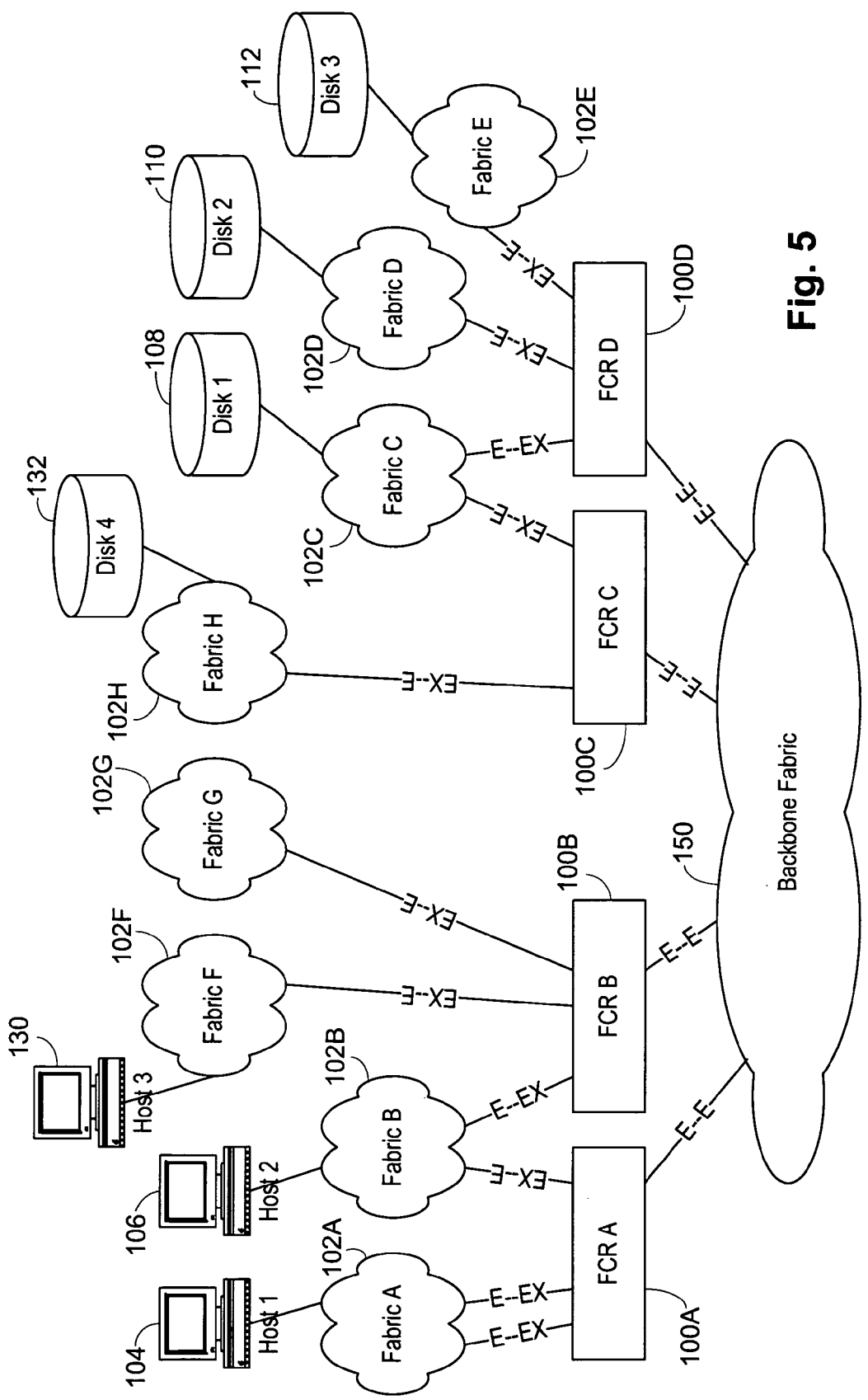
FIG. 5 is a block diagram of a series of Fibre Channel routers according to the present invention interconnecting a series of isolated fabrics through the use of a backbone fabric.

Referring now to FIG. 5, a much more complicated interconnection scheme is shown. While the interconnection schemes of the previous figures are satisfactory for a limited number of fabrics, if a great number of fabrics need to be interconnected a plurality of Fibre Channel routers 100 must be used. In the illustrated case a plurality of Fibre Channel routers A-D 100A-100D are used to interconnect a series of fabrics A-H 102A-102H. Fibre Channel routers A-D 100A-100D are connected to a backbone fabric 150 using E_ports. The backbone fabric 150 can be formed using conventional Fibre Channel switches in the preferred embodiment. Thus if host 104 wishes to send a frame to storage device 132, the packet will travel through fabric A 102A through Fibre Channel router A 100A through backbone fabric 150 to Fibre Channel router C 100C to fabric H 102H to storage device 132. To transfer frames through the backbone fabric, 150 the Fibre Channel routers A-D 100A-100D add several headers to the frames. At the EX_port, in the preferred embodiment, the Fibre Channel router 100 adds a global header, an encapsulation header, and a fabric routing header. These headers are described below in more detail. Then in a receiving Fibre Channel router C 100C, in the above example, a port, referred to as an NR_port, will remove the global, encapsulation, and fabric routing headers and develop a normal packet or frame which is sent to fabric H 102H.

Figure 6:
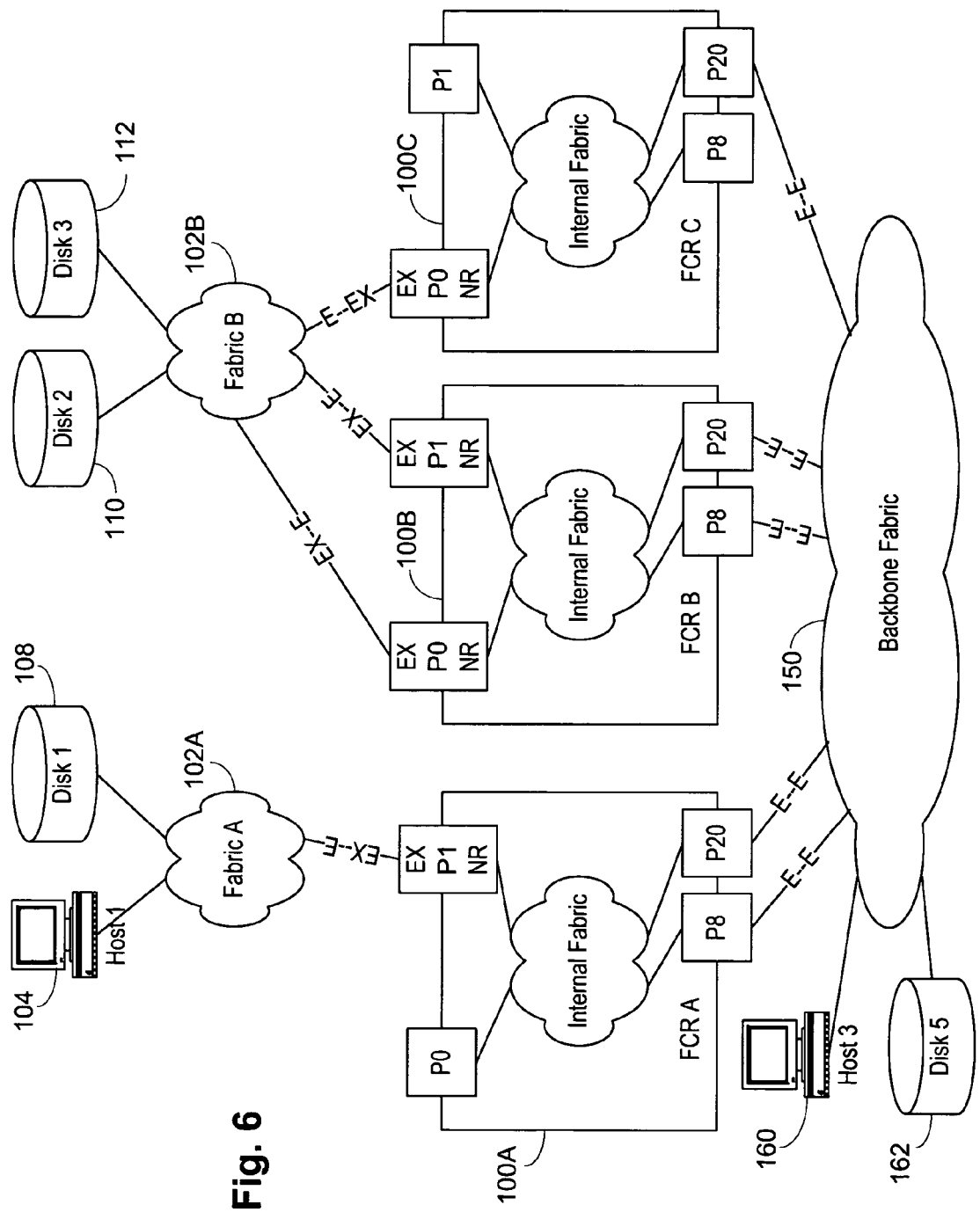
FIG. 6 is a more detailed view of the interconnections of the FIG. 5.

FIG. 6 is an alternate embodiment in which a host 160 and a storage device 162 are also connected to the backbone fabric 150. FIG. 6 additionally illustrates connections to specific ports on the Fibre Channel routers A-C 100A-100C In the preferred embodiment, each port in a Fibre Channel router 100 is actually a dual-ported device, one port externally facing and one port internally facing, with the preferred Fibre Channel router 100 treating the internal port connections as being connected by a fabric. As shown in FIG. 6, for ports connected to the edge fabrics 102 the external port is considered to be the EX_port and the internal port is considered to be the NR_port for conceptual purposes. For other designs the internal interconnections of the ports may be different, but it is believed that a similar nomenclature would be useful and applicable.

Connecting an EX_port to an E_port has the following properties. An EX_port connects to an existing fabric as an E_port. The EX_port implements enough of a subset of E_port functionality to allow fabric initialization and to allow critical fabric services to operate to make the fabric usable. The EX_port-to-E_port link is essentially an interswitch link (ISL). The EX_port will not merge the fabric that it is joining with any other Fibre Channel router-connected fabrics (the Fibre Channel router 100 may be connected to several fabrics). EX_ports present proxy devices representing real devices in remote fabrics in order to facilitate interfabric communication between devices. In certain embodiments, for simplicity, switching does not occur between multiple EX_ports of a Fibre Channel 100 router that are connected to the same edge fabric. Multiple EX_ports from the same Fibre Channel router 100 or from independent Fibre Channel routers 100 can connect to the same edge fabric in a redundant/resilient manner. Using methods described below, the port IDs of the proxy devices are preserved by the Fibre Channel routers 100 to provide as seamless of a failover as possible from the host's perspective. The IDs are preferably also preserved across Fibre Channel router 100 reboots and temporary loss of the backend connection to the device. The Fibre Channel router 100 achieves this functionality by emulating shared phantom domains as described more fully below.

Fibre Channel routers 100 have "router" ports known as NR_ports that send and receive frames containing Fibre Channel router "global header" information. In this description, as noted above, the phraseology EX_port is generally used for the externally facing portion of a port and NR_port is used for the internally or backbone facing portion of a port, but it is understood that they are the same physical port. Thus a frame is received at an EX_port, transmitted through the backbone fabric 150 to an NR_port and transmitted to the final fabric. The reverse flow would follow the same path but the port names would be changed to keep the context clear. Global header information includes details that facilitate route decisions and address translations. Frames traversing between networked Fibre Channel routers 100 travel effectively from NR_port to NR_port. Traffic from many devices from many fabrics can be carried across an intermediate or backbone fabric 150 via a single pair of Fibre Channel routers 100. If an FCIP tunnel exists in the backbone fabric, with Fibre Channel routers 100 on each side of the tunnel, then traffic for multiple fabrics can traverse across a single FCIP tunnel. For certain embodiments traffic for multiple fabrics can be carried over a single backbone ISL (interswitch link). In other embodiments global end-devices can insert the global headers into frames and direct frames directly to a Fibre Channel router's 100 NR_port. Note that the NR_port concept still applies to single Fibre Channel router 100 configurations because the backbone fabric is essentially the internal fabric in a single Fibre Channel router 100 configuration.

Three separate headers are used to carry frames between EX_ports and NR orts. The encapsulation header is the first header and specifies source and destination NR_ports in the SID and DID fields. This header has an identical format as a normal FC-FS frame header. Therefore legacy switches in a backbone fabric can route with this header. "Global Header" information is contained in two headers. Some of the global header is included in a short header known as the interfabric addressing header. The remaining "global header" information is contained in the normal FC-FC frame header that is contained in the frame, is described above.

Figure 7:
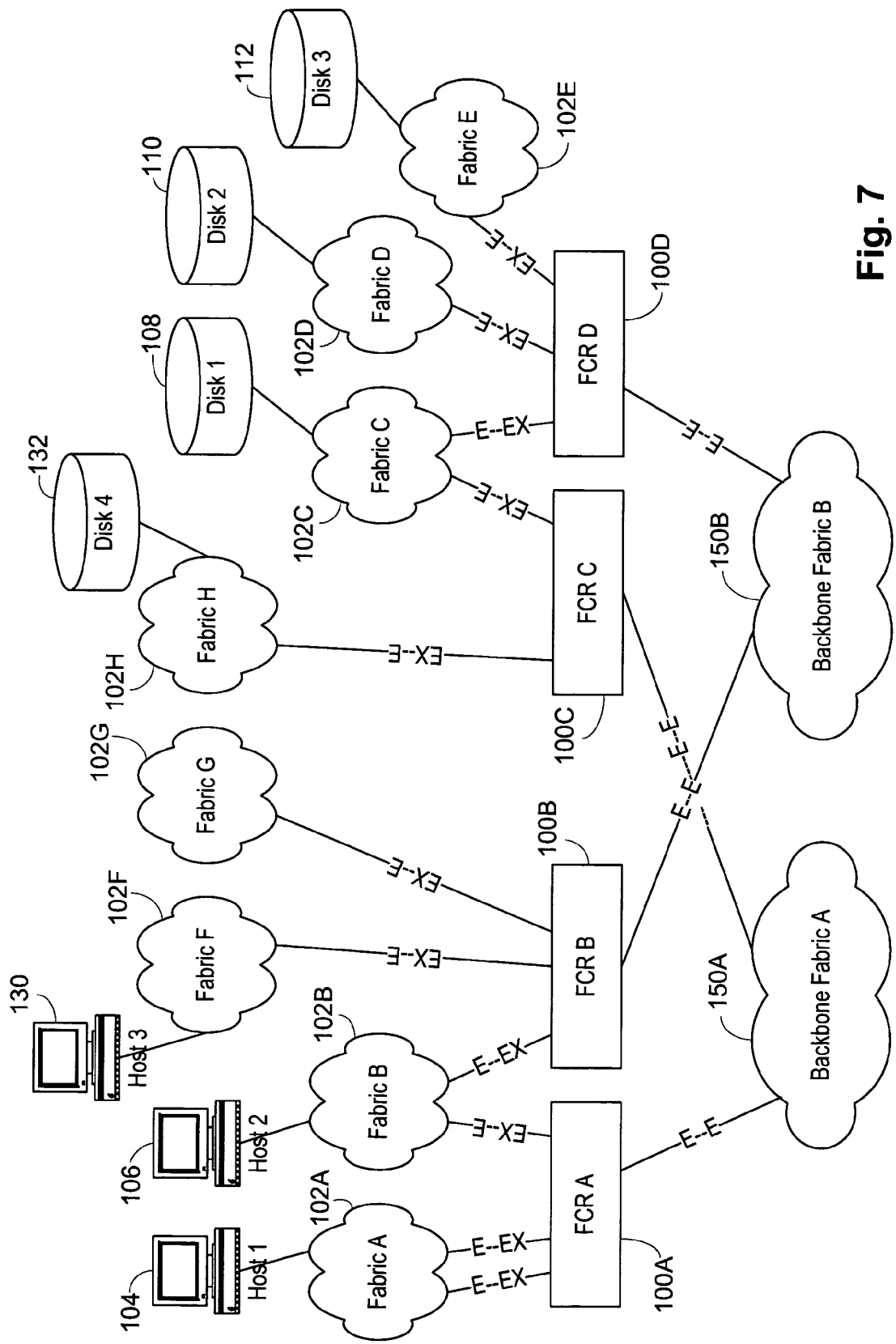
FIG. 7 is a block diagram of a series of Fibre Channel routers according to the present invention interconnecting a series of fabrics using two backbone fabrics.

FIG. 7 is similar to FIG. 5 except that two backbone fabrics A and B 150A, 150B are utilized. In this case backbone fabric A 150A is used to interconnect Fibre Channel router A 100A to Fibre Channel router C 100C, while Fibre Channel router B 100B is connected through backbone fabric B 150 B to Fibre Channel router D 100D.

Figure 8:
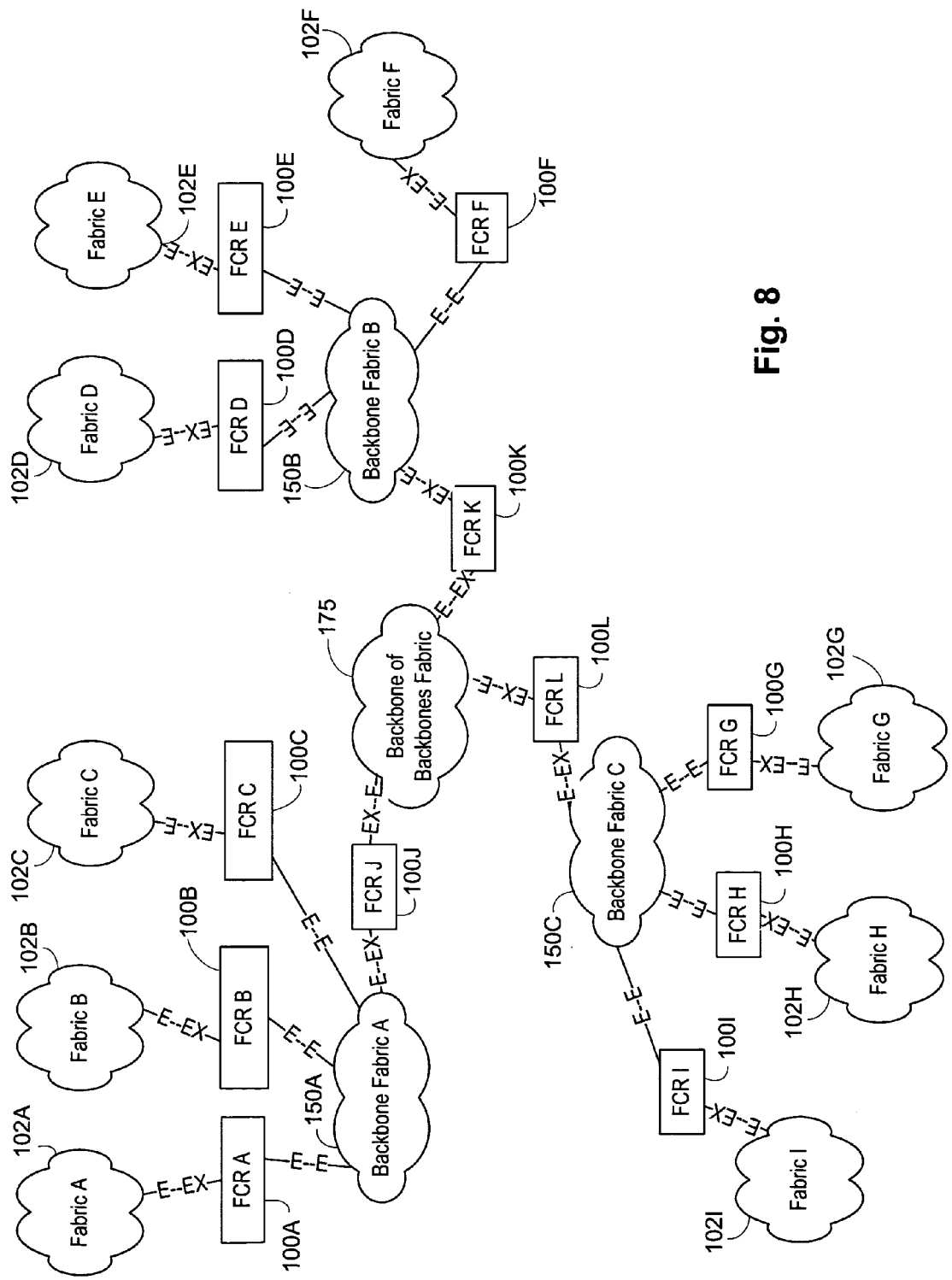
FIG. 8 is a block diagram of a series of backbone fabrics joined by a backbone

FIG. 8 illustrates a larger example. In this example there are three backbone fabrics A, B and C 150A, 150B and 150C with associated Fibre Channel routers 100 and fabrics 102. They are connected through Fibre Channel routers J, K and L 100J, 100K and 100L to a backbone of backbones fabric 175. In this instance the Fibre Channel routers 100 connect with E_Ports to each fabric 150, 175. The Fibre Channel routers 100 in this case are used to keep the fabrics from merging and only perform routing of the frames, as the proper headers are already in place in the frames and no conversions need to be done. The header addition or removal and needed conversions will be done be the Fibre Channel routers 100 attached between the edge fabrics 102 and the backbone fabrics 150.

Figure 9:
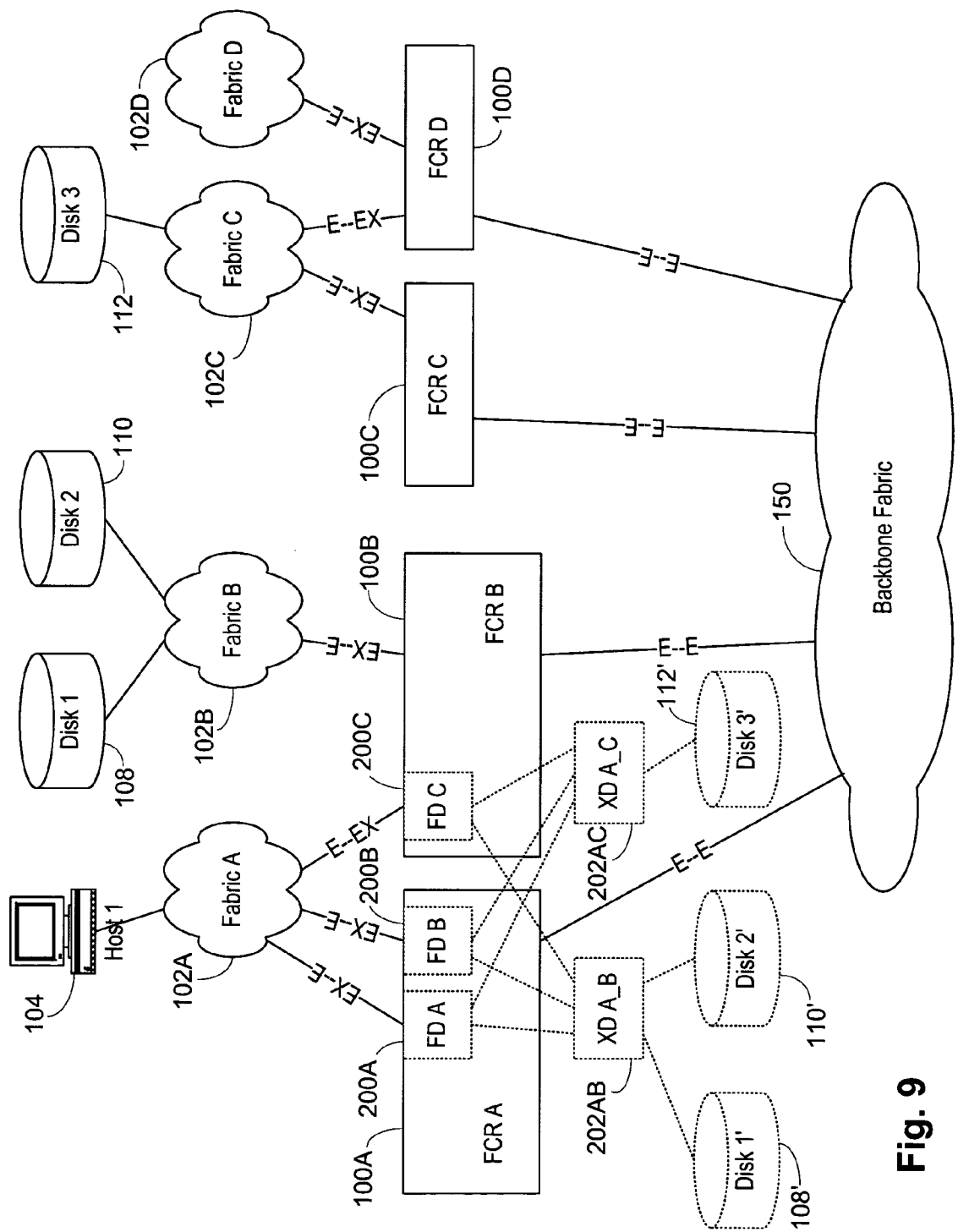
FIG. 9 is block diagram of a plurality of Fibre Channel routers according to the present invention interconnecting a series of fabrics through a backbone fabric with exemplary front and translate phantom domains utilized to provide the phantom or proxy operations.

FIG. 9 illustrates the use of front phantom domains and translate phantom domains to allow the Fibre Channel routers 100 to perform the necessary translations and yet allow efficient operations. A front phantom domain 200 is provided for each EX_port of a Fibre Channel router 100 connected to a fabric. In the illustrated embodiment there are front phantom domains 200A, 200B, and 200C for the connections to fabric A 102A. Each of these front phantom domains 200 is in turn connected to a translate phantom domain 202 such as 202AB and 202AC. A translate phantom domain 202 is provided for each fabric where translations are necessary, such as in the illustrated case fabric B 102B and fabric C 102C. These translate phantom domains 202AB and 202AC present the phantom or proxy storage devices as devices attached to the translate phantom domain 202. There is an owner front phantom domain for each translate phantom domain. The original owner front phantom domain is the first front phantom domain created which needs to connect to the translate phantom domain. In the illustrated embodiment, translate phantom domain A_B 202AB presents storage device 108' and storage device 110', which correspond to storage device 108 and storage device 110 connected to fabric B 102B. Translate phantom domain A_C 202AC presents storage device 112'. FIG. 9 shows only the front and translate phantom domains 200 and 202 necessary for connection to fabric A 102A for simplicity.

Sharing a translate phantom domain 202 between Fibre Channel routers 100, as opposed to providing a translate phantom domain from each Fibre Channel router and resultant duplication of proxy devices, allows for load balancing by the edge fabric and is less disruptive should a link fail as the proxy device ID will not need to be changed. Providing one translate phantom domain 202 per fabric, as opposed to a single translate phantom domain for all fabrics, similarly provides load balancing and link failure advantages.

Figure 9A:
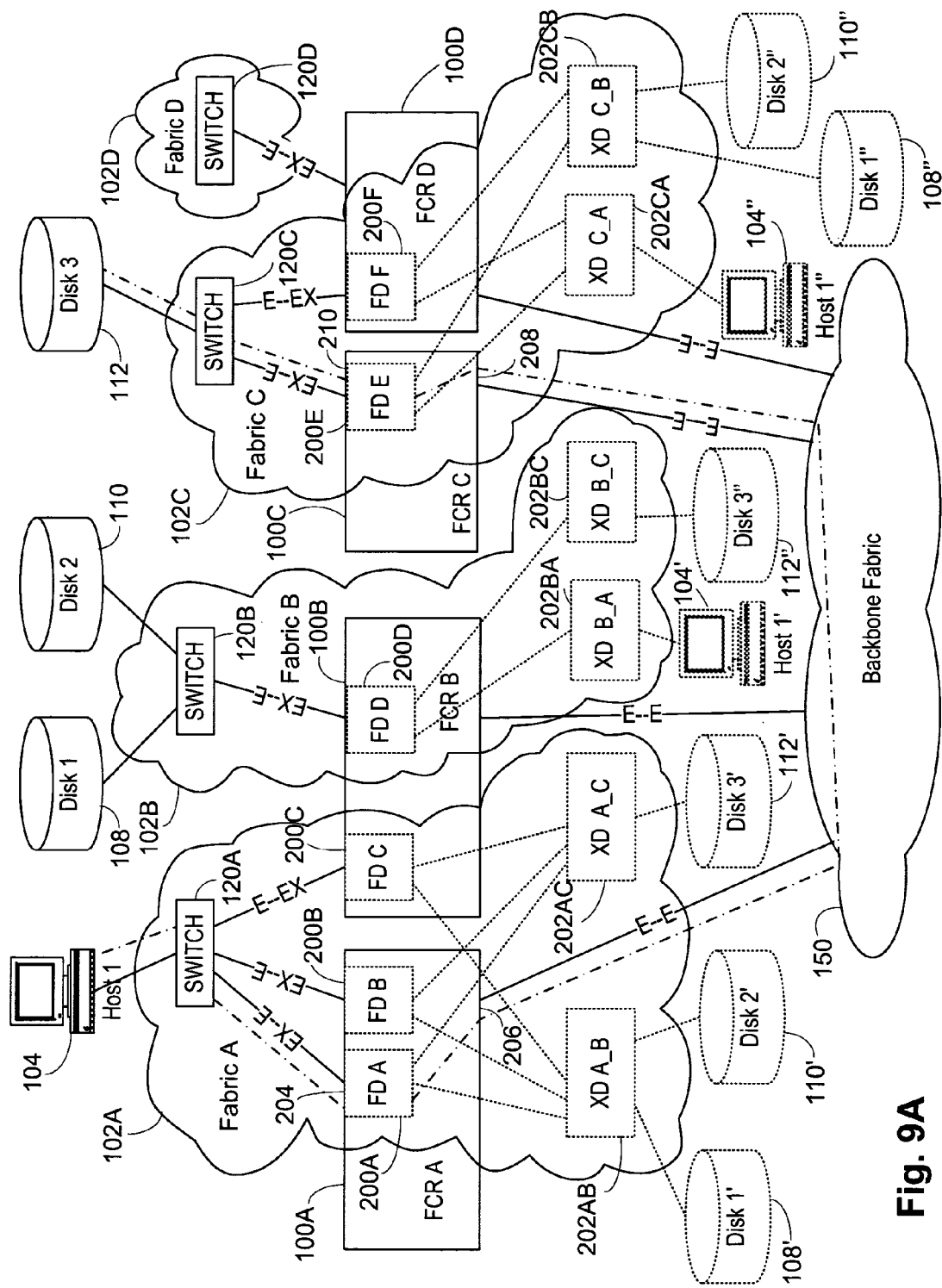
FIG. 9A is a more detailed version of FIG. 9 showing all of the front and translate phantom domains.

FIG. 9A shows the full front phantom domain 200 and 202 environment for all of the fabrics 200 in FIG. 9A. The fabrics A, B and C 102A-C are shown in an expanded format to indicate that the front and translate phantom domains are part of the respective fabric. For example, fabric B 102B includes front phantom domain D 200D and translate phantom domains B_A and B_C 200BA and 200BC. Translate phantom domain B_A 200BA presents host 104', while translate phantom domain B_C 200BC presents storage device 112", the second proxy for that particular storage device. Thus it can be seen that each fabric includes translate phantom domains for each of the other fabrics being connected. In the illustrated embodiment this means each fabric includes two translate phantom domains.

Each front phantom domain is emulated as being connected to each of the translate phantom domains in the particular fabric. Thus front phantom domains E and F 200E, 200F are connected to translate phantom domains C_A and C_B 202CA, 202CB. Translate phantom domain C_A 200CA presents host 104", while translate phantom domain C_B 200CB presents storage devices 108" and 110". Storage device 112 thus addresses host 104" connected to translate phantom domain C_A 200CA.

While the phantom domains and proxy devices described above provide the addressing and fabric construct needed by the various mode devices, a description of actual frame flows in such an environment is considered very helpful. In FIG. 9A solid line links are physical links, dotted line links are emulated or phantom links and the dot-dash line is an exemplary frame path. Host 104 provides a frame addressed to storage device 112'. The frame travels to switch 120A and then to port 204 of Fibre Channel router A 100A. As described more fully below, port 204 performs the necessary address translations and develops interfabric and encapsulation headers for the frame. The Fibre Channel router A 100A then routes the frame to port 206, which is connected to the backbone fabric 150. This routing is based on the routing tables present in the Fibre Channel router A 100A. The backbone fabric 150 then routes the frame to port 208 on Fibre Channel router C 100C, the port connected to the backbone fabric 150. The Fibre Channel router C 100C routes the frame to port 210. Port 210 acts as the NR_port and removes the interfabric and encapsulation headers and performs the final address translation. Port 210 then provides the frame to switch 120C, which routes the frame to storage device 112. It is understood that these phantom domains are software constructs used by various software entities in the Fibre Channel routers 100 to perform the necessary translations operations.

Figure 10:
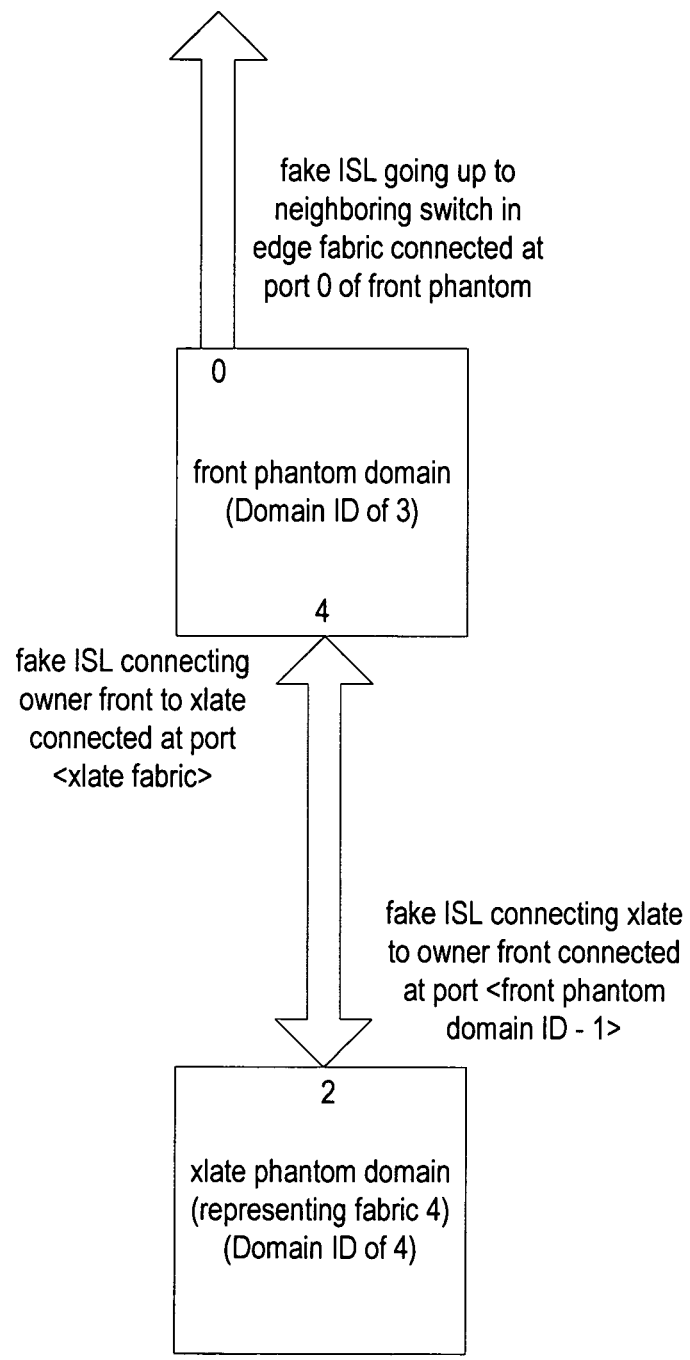
FIG. 10 is an illustration of the connections and port numberings for front and translates phantom domains according to the present invention.
Figure 11:
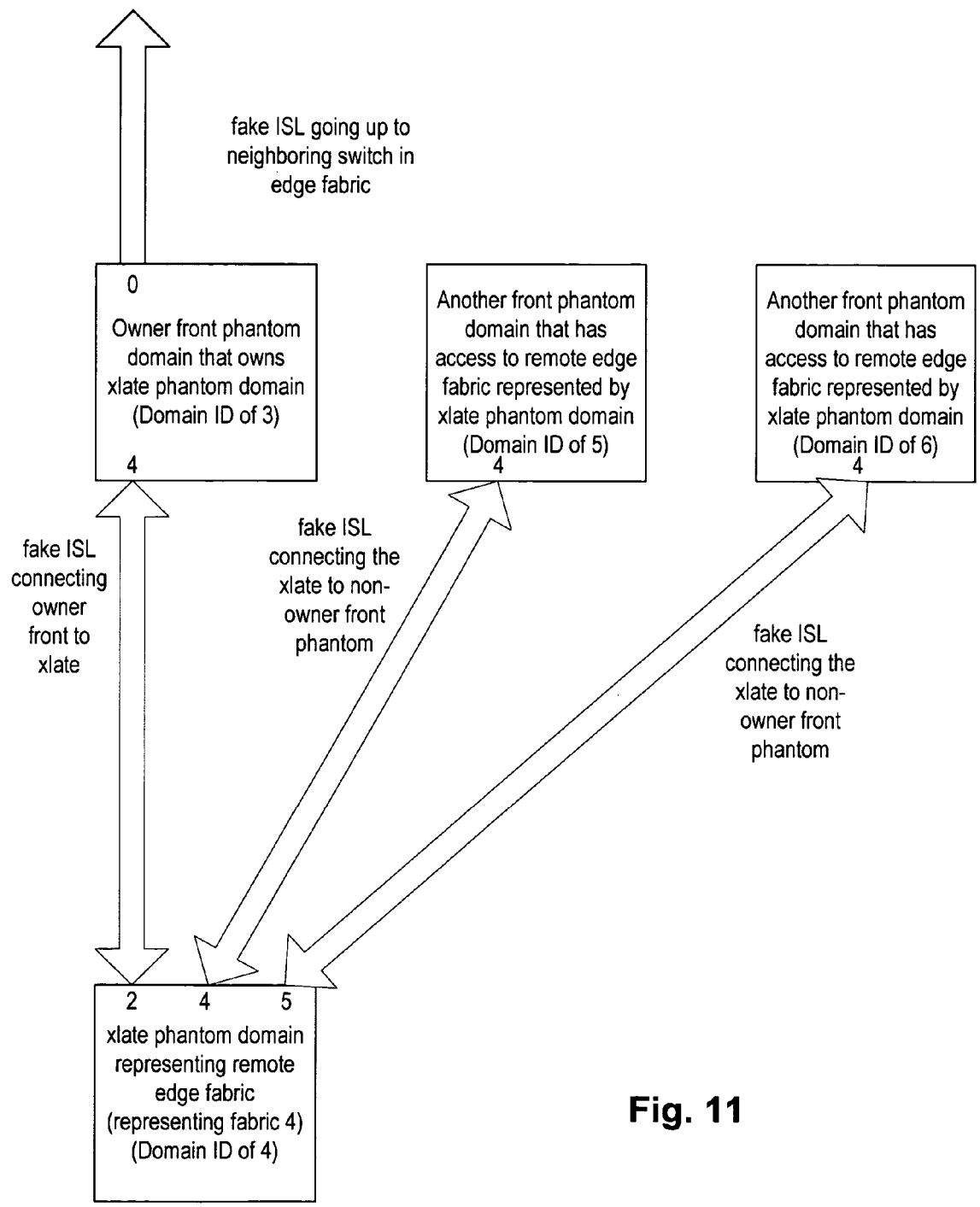
FIG. 11 is a more complicated illustration of the front and translate phantom domains for a plurality of connections.

FIG. 10 illustrates the case of a front phantom domain, in this case with a domain ID of 3 which was developed during typical domain ID development in the fabric. The front phantom domain connects through the port in the Fibre Channel router 100 connected to the edge fabric 102. The front phantom domain is connected to a translate phantom domain representing one of the particular fabrics. In this case it represents fabric 4. The front phantom domain uses port number 0 to connect to the actual port and a port number equal to the translate phantom domain to connect to the translate phantom domain. The translate phantom domain connects to a front phantom domain at a port number one less than the front phantom domain ID. Thus in the example of FIG. 10, the front phantom domain uses a port 4 to connect to port 2 of the translate phantom domain. The example shown in FIG. 11 has three front phantom domains having IDs of 3, 5 and 6 connecting to the translate phantom domain representing fabric 4. Each of the front phantom domains will have its port 4 connected to the translate phantom domain while the translate phantom domain will use ports 2, 4 and 5 to connect it to the various front phantom domains.

In the operation of the Fibre Channel routers 100, each of the front and translate phantom domains have both World Wide Names (WWN) and domain IDs. It is necessary for phantom domains and phantom domain ports to have WWNs for operational (i.e. fabric formation, traffic generation, etc) and management purposes. A front phantom domain requires a node WWN as well as a port WWN to establish a neighbor relationship with an edge fabric through Fibre Channel ELP frames. The node WWN is used again when the front phantom domain initiates an RDI request (RDI=Request Domain ID) to receive a valid domain ID from the Principal Switch in the edge fabric. The ports between the front and translate phantom domains do not require port WWNs from an operational perspective since the ELP between a front phantom domain and the translate phantom domain is implicit. However, the translate phantom domain still requires a node WWN in order to receive a domain ID from the Principal Switch. With the exception of the EX_ports, phantom domain ports do not require WWNs from an operational perspective. However, many management applications rely upon port WWNs as a key for port objects, which may be needed to build the topology. As a result, port WWNs need to be generated for the ports connecting the front and translate domains as well as the translate domain proxy device ports. Since the Fibre Channel router 100 requires many WWNs to be generated, NAA type 2 and type 5 WWN formats are needed. In addition, the Fibre Channel router 100 makes use of the various MAC addresses assigned to the platform to derive WWNs. One base MAC address is assigned per the Fibre Channel router 100 in the preferred embodiment. In addition, each external port is assigned a MAC address since the ports can be Gigabit Ethernet ports in the preferred embodiment. Each port MAC address is derived from a base MAC address by setting the last nibble to the port number.

The node WWN of a front phantom domain is an NAA type 5 WWN derived from the MAC address of the platform and EX_port port number. In the NAA type 5 format, 4 bits denote the NAA type (5) and 48 bits are used for the MAC address which contain the serial number and manufacturer's code which leaves 12 available bits. The top 4 bits of the 12 available bits are assigned to 0xE, denoting "front phantom domain", and last byte is assigned with the EX_port number. In one embodiment up to 16 WWNs may be used for front phantoms since there is a front phantom domain per EX_port and there are 16 ports in the Fibre Channel router 100. In other embodiments there can be greater or fewer ports. The following describes the format of the front domain WWN:

5n:nn:nn:nn:nn:nn:nE:xx, where the n's represent the MAC address, E denotes "front phantom domain" and xx=port number.

The port WWN used for the front phantom domain's external port, which is the same port as the physical external port, is an NAA type 2 port WWN and is the WWN of the EX_port. This WWN is derived from the MAC address of the platform and the external port number. Up to 16 WWNs may be used for these ports in one embodiment and greater or fewer in other embodiments. The following describes the format of the front phantom domain EX_Port WWN.

20:xx:nn:nn:nn:nn:nn:nn, where the n's represent the MAC address of Mars and xx=port number.

The port WWNs for the front phantom domain ports that connect to the translate domain(s) are NAA type 2 names with identical format as above. These names are derived from the MAC address of the external port (as opposed to the MAC address of Fibre Channel router 100) and the port number of the phantom port. There may be up to 128 translate domains there can be up to 128 front domain ports in one embodiment. Since there are up to 16 front domains, there may be up to 16*127 or 2032 front domain port WWNs. The following describes the format of the front domain phantom port WWN:

20:xx:nn:nn:nn:nn:nn:nn, where the n's represent the MAC address of external port and xx=phantom port number.

The Fibre Channel router 100 provides unique translate phantom domain WWNs within the SAN in order to satisfy management applications that are designed assuming globally unique WWNs. Translate phantom domain node WWNs are allocated from a pool of WWNs on a first come first serve basis. They are allocated in a sequential manner until the pool is exhausted. Once the pool is exhausted, allocation resumes from the start of the pool. Since the pool is sufficiently large, WWN conflicts are highly unlikely. The node WWN used is an NAA type 5 WWN derived from the MAC address of the EX_port of the owner front phantom domain, the first front phantom domain created which needs the particular translate phantom domain. As mentioned previously, there are 12 available bits in the NAA type 5 format. The top 4 bits of the available bits are set to 0xF, denoting "translate phantom domain," and next 8 bits are fully utilized to construct the pool. This allows creation of a pool of 256*16 or 4096 node WWNs per Fibre Channel router 100. Since translate phantom domain ownership can change, front phantom domains sharing a translate domain employ an inband protocol to exchange translate phantom domain node WWNs as well as domain IDs. The following describes the format of the translate phantom domain node WWN:

5n:nn:nn:nn:nn:nn:nF:xx, where the n's represent the MAC address of EX_port of the original owner front phantom domain, F denotes "translate phantom domain" and xx=8 bits used to generate as many WWNs as possible.

Translate phantom domains have ports that connect to front phantom domains and ports that connect to proxy devices (phantom F_ports). There are more translate phantom domain theoretical ports than available WWNs since there can be up to 127 translate domains per fabric each with 256 ports in certain embodiments. Therefore, translate phantom domain port WWNs are allocated from a pool of WWNs on a first come first serve basis. They are allocated in a sequential manner until the pool is exhausted. Once the pool is exhausted, allocation resumes from the start of the pool. Since the pool is sufficiently large, WWN conflicts are highly unlikely. These WWNs are NAA type 5 format with the first nibble of the available 12 bits as 0xA-0xD. The WWNs use all of the port MAC addresses for the MAC address portion of the WWN and utilize all remaining 8 bits. This allows creation of a pool of 256*16*4 or 16,384 WWNs. This number of WWNs is ample for scalability. For example, if a Fibre Channel router 100 has 15 front phantom domains, each connected to a different fabric and 127 translate phantom domains per fabric, this results in 15*127 (1905) translate phantom domains. Assuming each translate phantom domain connects to 4 front phantom domains this results in 7,620 port WWNs. If 1,000 proxy devices are created in each domain fabric, this is still safely within the limits of the port WWN pool. The owner front phantom domain is responsible for generating the translate phantom domain port WWNs. Since translate phantom domains are shared among multiple front phantom domains, front phantom domains employ an Inband protocol to exchange translate phantom domain port WWNs. The following describes the format of the translate phantom domain port WWN:

5n:nn:nn:nn:nn:nn:n[A-D]:xx, where the n's represent the MAC address of all EX_ports of the platform, A-D denotes "translate phantom domain ports" and xx=8 bits used to generate as many WWNs as possible.

As mentioned previously, translate phantom domains may be shared among several front phantom domains that are presented by multiple physical Fibre Channel routers 100. The Fibre Channel router 100 with the owner front phantom domain allocates the node and port WWNs to the translate phantom domain. If the owner front phantom domain becomes unavailable, translate phantom domain ownership can change and may possibly change to a different physical Fibre Channel router 100. This potentially depletes the finite number of translate phantom domain node and port WWNs from the original Fibre Channel router 100 pool. When a WWN pool is nearly exhausted, a warning event is generated. When the pool is exhausted, allocation resumes from the start of the pool. Another event is generated warning the user that the pool has been reset. Once the pool has been reset it is possible for WWN duplication to occur. Since the WWN pools are sufficiently large, there is a low probability of exhausting the WWN pool. In addition, the rate of depletion is expected to be flat once the SAN is established. Even in the event that a front phantom domain loses ownership of a translate phantom domain, it is likely that it will come back online in the same edge fabric. The translate phantom domain it originally owned will likely still exist in the fabric, which would not cause WWN depletion. If the front phantom domain comes back online in the same fabric and is required to establish a new translate phantom domain for the same remote fabric, then new WWNs will be used from the top of the pool. This does cause WWN depletion, however, in this case the original translate phantom domain no longer exists so the WWNs originally used for the translate phantom domain are safe to reuse in the event the pool needs to be reset. Therefore, no special action needs to be taken when pool reset occurs. To guarantee elimination of WWN reuse causing management application issues, the user can disable all EX_ports attached to fabrics where high WWN depletion occurred (e.g. fabrics with a large number of translate phantom domain ports where EX_Ports went offline/online frequently).

It is understood that the phantom domains are software constructs in the preferred embodiment, though they could be developed in hardware. The Fibre Channel router 100 handles both the fabric level operations of each of these domains, such as communications with the principal switch to receive a domain ID; respond to ILS frames; perform FSPF determinations and so on, and frame level operations such as address translation and routing, through hardware assist is preferred in the frame level operations.

EX_ports support a subset of fabric services. See list below:

Zoning—Zoning ILSs are supported in order to satisfy other switches within the fabric that want to share the zoning database. In addition, the Fibre Channel router 100 searches the zoning database to extract the WWNs for interfabric device sharing and to potentially determine the zoning policy for the imported/exported devices.

Fabric Build—Enough features are supported to convince the fabric of the presence of phantom switches that become the phantom domains. EX_Ports provide fabric paramaeters (such as E_D_TOV, R_A_TOV and PID format) at port initialization time. Users are allowed to configure these parameters to ensure EX_ports are allowed to merge with the edge fabrics. Alternatively, these parameters can be detected from the edge fabric and set to match. Note that the TOV values are "fake" values used only to facilitate port initialization.

FSPF—Enough features are supported to convince the fabric of the phantom switch topology presented by the Fibre Channel router 100. Routes to the translate phantom domains are advertised as maximum cost links to prevent the fabric from establishing intrafabric router using these links. Should the loss of a path cause the fabric to want to utilize these links for intrafabric routing, the Fibre Channel router 100 will disable the EX_ports in some embodiments.

NS/RSCN—A small subset of NS (Name Server) features are supported in order for the Fibre Channel router 100 to satisfy other switches within the fabric that want to share NS databases. In addition, the Fibre Channel router 100 needs to determine the presence and state of devices to be exported. NS queries from end devices are not supported in certain embodiments for simplicity.

Management Server (MS)—A small subset of features are "faked" so that the MS platform support does not need to be disabled within an edge fabric. In addition, a small subset of the topology commands supported a fabric architecture so that the API can create its object hierarchy (topology). From the backbone fabric 150 perspective, the NR_ports and EX_ports are essentially "invisible" as the E_port MS implementation does not return port information for "special" ports (i.e. EX_ports, iSCSI ports, etc).

The management model of the Fibre Channel router 100 is that of a "switch with special ports." Port management involves port configuration and status.

Port configuration includes the following:

EX_port mode Enable/Disable—Ability to enable/disable EX_port functionality per port and the ability to select the fabric ID for a port.

Fabric ID—Selecting the fabric ID for a port provides the mechanism to identify fabrics. For example, the way a fabric becomes "fabric 1" is by configuring a EX_port with a fabric ID of "1".

Fabric Parameters—Fabric parameters are exchanged by E_ports at port initialization. Incompatible fabric parameters cause E_ports to segment. EX_Ports exchange these parameters with the neighbor E_port. These parameters are typically administered at a switch level. Since EX_ports represent a front phantom domain, these parameters need to be managed on a port by port basis. The fabric parameters include:

R_A_TOV
E_D_TOV
PID format

Front Phantom Domain ID—When configured by a user, the front phantom requests this domain ID from the Principal Switch. If a different domain ID is issued, the new value is accepted and persistently stored as the new preferred domain ID.

Another aspect of port management is port status, which includes status on the above listed configurable parameters. Additional parameters include last error (e.g. FID Conflict, FID oversubscribe, etc), switch node WWN of the front phantom domain for this EX_port and information on the edge fabric such as Principal Switch information (e.g. WWN, domain ID, etc.).

When an EX_port receives a EFP or Enable fabric port frame, from that point on, fabric ILSs are handled by the Fibre Channel router 100 in a passive manner. Passive manner means is that each ILS sent by a neighboring or a principal switch in an edge fabric drives a fabric state machine for front and translate phantom domains.

The front phantom domain is required to handle all the ILSs listed below. The front phantom domain also handles any RDI responses on behalf of translate phantom domains that it owns, and INQ requests for translate phantom domains it may or may not own. An RDI response is handled exclusively by owner front phantom domains because owner front phantom domains initiate RDI requests on behalf of translate phantom domains. Either owner or non-owner front phantom domains can respond to INQ requests on behalf of translate phantom domains because INQ response information is calculated based on a fixed algorithm.

An EX_port goes through 4 fabric states: Init, Merge, Rebuild, and Done. When an EX_port comes online, it goes to Init state. From there, the EX_port can go to either Merge or Rebuild. Merge is the case where phantom switches are "merging" to edge fabrics after the edge fabrics have completed Principal Switch selection. The Merge path is taken only if the first EFP is non-empty once the EXport has come online. Rebuild is the case where phantom switches are "rebuilding" with edge fabrics since Principal Switch selection has not taken place. The rebuild path is taken if empty EFPs are received once the EX_port has come online or a BF request has been received. Once the EFP payload is received with the EX_port's front phantom domain ID embedded, the EX_port goes to Done.

EX_ports send out INQs into the connected edge fabric to find real switch information in the edge fabric. Outbound INQ ILSs are triggered when an INQ ILS is received for an EX_Port front phantom domain.

The following fabric ILSs and states are handled.

EFP

When receiving an empty EFP as the first EFP after the port going online or right after receiving a BF, the front phantom domain responds by accepting the EFP and sets the port state to Rebuild.

When receiving a non-empty EFP right after the port receiving the first EFP after the port goes online, the front phantom domain responds by accepting the EFP. The edge fabric Principal Switch WWN is remembered and an RDI request is sent to receive a valid domain ID for the front phantom domain. Anytime a non-empty EFP is received with the front phantom's assigned domain ID, the following algorithm is executed.

Port state is set to done.

Update the NR_port database to get an updated list of remote edge fabrics that are rechargeable.

Go through the domain list and add or remove domains from the last remembered list. In certain embodiments the Domain ID and switch WWN combination is remembered.

If any phantom domain has been removed, send out a full LSR database to the edge fabric to update routing.

All received EFPs are accepted as is and the EX_port generates no EFP on its own.

DIA

A DIA request is always accepted. If the port state is in Rebuild, an RDI request is sent to receive a valid domain ID for the front phantom domain.

BF

When receiving a BF request at anytime, it is accepted. The Port state is updated to Rebuild. All other port states, except domain IDs for all phantom domains, are remembered until overwritten by the fabric reconfiguration process.

RDI

When sending an RDI request for front or translate phantom domains, previously saved domain IDs are used if available. Otherwise, a default domain ID of 1 is requested. When receiving an RDI response targeted for a front phantom domain, the domain ID assigned is remembered and saved in non-volatile memory. In addition, if the front phantom domain owns any translate phantom domain and valid domain IDs are assigned to the translate phantom domains, RDIs are sent by the front phantom domain on behalf of the translate phantom domain. When receiving an RDI response targeted for a translate phantom domain, the domain ID assigned and switch WWN are remembered and saved in non-volatile memory. If the translate phantom domain was ever allocated before, a full LSR is sent to update the addition of the translate phantom domain. Otherwise, domain only LSR is sent to initiate a full LSR sequence with the neighboring switch. If the newly assigned domain ID is different than the previously assigned domain ID, imported devices are re-imported using the proxy Port ID recalculated based the new domain ID.

INQ

When receiving an INQ request, all the response payload fields are fixed using an algorithm. Switch names are fixed at "ff_<domain>_<Port number> for front phantom domains and "xf_<domain>_<fabric number> for translate phantom domains. IP addresses are zeroed out. Fake model number and firmware version are returned to mimic a selected version. The edge fabric switches initiate different NS requests based on the returned firmware version number.

Although FSFP standards requires all switches within a fabric to maintain full path configuration (Link State Database), phantom domains do not need full topology information stored to communicate with real switches in an edge fabric and to fake the real switches in the edge fabric into believing that they have full topology information of phantom domains. However, more complete or even full topology or substitutes can be stored and used if desired. Each front phantom domain generates an LSU payload that contains itself and its links to the edge fabric and translate phantom domains. Only when a front phantom domain owns a translate phantom domain, does the front phantom domain need to append to an LSU payload the translate phantom domain and all links from the translate phantom domain to all front phantom domains with access to the remote edge fabric that the translate phantom domain represents.

All FSPF ILSs are targeted and handled by front phantom domains. Although FSPF ILSs contain translate phantom domain specific payloads that are handled by owner front phantom domains, no FSFP ILSs are targeted to translate phantom domains.

The following ILSs and states are handled:

HLO

Once a front phantom domain has been assigned a domain ID and a subsequent EFP has been received with a full domain list, a HLO is responded by another HLO with remote switch ID and local switch ID of the original HLO swapped. In other words, HLO's from an EX_port are generated only when a HLO from neighbor is received.

Once a full LSU has been sent, if a neighboring switch sends a one-way HLO, which contains 0xffffffff as the remote switch ID, the LSU state is re-initialized to the beginning and the domain waits for a full LSR update from the neighboring switch.

LSU

Once a front phantom domain has been assigned a domain ID and a subsequent EFP has been received with a full domain list, an LSU is handled in the following manner:
A LSA is sent right away. The LSU payload is examined to remember an incarnation number for valid domains within the edge fabric. Otherwise, an initial incarnation number of 0x80000001 is used for phantom domains. If the LSU is sent by a real switch in an edge fabric and an end-of-database has been received, an LSU with front phantom domain ID with no links is sent and subsequently another LSU with end-of-database is send.

LSA

When receiving an LSA for a front phantom domain and the front phantom domain has just sent its domain only LSU, send the front phantom domain's full LSU that contains itself, any links originating from the front phantom domain and any translate phantom domains the front phantom domain owns and any links originating from the translate phantom domains.

When receiving an LSA for a translate phantom domain and owner front phantom domain has already sent a domain only LSU on behalf of the translate phantom domain, send the front phantom domain's full LSU that contains all translate phantom domain links.

Multiple EX_ports can be used to support load distribution. The EX_ports can be from a single Fibre Channel router 100 or different Fibre Channel routers 100 within a backbone. The EX_ports can also be from multiple backbone fabrics 150.

The EX_ports create front phantom domains to represent the ports themselves and create a translate phantom domain for each remote edge fabric that the local edge fabric communicates to. As noted, a reason for creating the front and translate phantom domains are to allow existing FSPF within the local edge fabric to handle load distribution, path selection, failure handling, etc. and to preserve PIDs assigned to proxy devices. In order for multiple front phantom domains to create a single translate phantom domain for a particular remote edge fabric, EX_ports must:

Discover all front phantom domains that connect to the same edge fabric and have access to the same remote edge fabric.

Vote one of the front phantom domains to own the remote edge fabric to drive translate phantom domain handling.

When a front phantom domain represented by an EX_port has merged to an edge fabric (the front phantom domain has been assigned a unique domain ID by the edge fabric's Principal Switch) FCR_EF_ALIVE messages are sent to all other front phantom domains. An FCR_EF_ALIVE message contains the front phantom domain ID, the Principal switch WWN of the edge fabric the EX_port is connected to, the switch WWN of Fibre Channel router 100, and a list of edge fabric entries. An edge fabric entry contains, for all edge fabrics minus the one the originating EX_port is attached to, the fabric tag of the edge fabric, the translate phantom domain ID assigned (if not yet assigned, the domain ID is set to 0 and the allocated translate phantom domain node WWN and port WWNs are zeroed out), the lowest front phantom domain ID received so far (initial lowest front phantom sent out is the local front phantom domain ID), the owner front phantom domain ID (initial owner front phantom domain ID sent out is 0), and the list of edge fabric switches that have completed handshakes with the translate phantom domain.

If a front phantom domain receives an FCR_EF_ALIVE message from another front phantom domain connected to the same edge fabric, the list of reachable edge fabric entries is processed one by one using the following algorithm:

If the front phantom domain receiving the FCR_EF_ALIVE message is not able to reach the fabric specified by the fabric tag in the entry, ignore the entry. Otherwise, continue.

If the front phantom domain owns a fabric that the front phantom domain is no longer able to reach and another front phantom domain has been elected as an owner, the local front phantom domain is set to non-owner and cached information is cleared.

If cached information of the remote front phantom domain, which originated the FCR_EF_ALIVE message, previously had an invalid translate phantom domain ID but the FCR_EF_ALIVE message now contains a valid translate phantom domain ID, a full FSPF is sent to create an uplink from the translate phantom domain to the originating front phantom domain.

Cache the lowest front phantom domain ID and the owner front phantom domain ID using the originating phantom domain ID and fabric tag within the entry.

If the receiving front phantom domain's owner for the fabric specified in the entry has not been set:

If owner front phantom domain ID embedded in the entry is a valid domain (1-239), it is accepted. The receiving front phantom domain's owner front phantom domain ID is set to the embedded value.

If the owner front phantom domain ID embedded in the entry is not a valid domain (less than 1 or greater than 239), it is ignored. If the local lowest front phantom domain ID is lower than the one embedded in the entry, it is ignore. If the local lowest front phantom domain ID is higher than the one embedded in the entry, set the local lowest domain ID to the embedded value. If the local lowest front phantom domain ID is the same as the embedded value in the entry, iterate through a list of cached lowest domain ID, from all remote front phantom domains reachable to the edge remote fabric specified in the entry. If all cached lowest domain IDs of all remote front phantoms are the same for the remote edge fabric, set the local owner front phantom domain ID to the matching front phantom domain ID.

If the local owner front phantom for the fabric specified in the entry is set:

If the incoming entry contains the same owner front phantom, this is normal. If the incoming entry contains a different owner front phantom, this is an error case. The EX_port with higher domain ID is disabled and an error message is printed to notify users. After the first three FCR_EF_ALIVE messages are transmit for a newly reachable edge fabric, iterate through the cached lowest and owner front phantom domain ID list to see if any other front phantom domains can reach the same fabric. If the local front phantom domain is the only one able to reach to the remote fabric, set the local front phantom domain as the owner of the fabric.

The list of un-reachable edge fabric entries are handled based on the following algorithm:

If the cached information of the remote front phantom domain, which originated the HLO, was previously set to reachable to the now un-reachable edge fabric, a full FSPF is sent to remove the link. If the local front phantom domain is able to reach the edge fabric and the remote front phantom domain is not able to but owns the edge fabric, clear out the voting information while saving the translate phantom domain information from the remote front phantom domain. Also, send a full FSPF to reflect front phantom domain's ownership loss.

Devices connected to an edge fabric communicate with devices from another edge fabrics through proxy devices presented by EX_ports. However, when the Fibre Channel frames are delivered into a backbone fabric, source and destination addresses are converted to NR_ports for delivery. These NR_ports can be a list of EX_ports connected to other edge fabrics or special ports dedicated for fabric-to-fabric routing. Since the frame must be re-translated when arriving at an egress port, NR_port information is added as part of a special header to facilitate backbone fabric 150 routing.

Each Fibre Channel router 100 maintains a full record of all Fibre Channel routers 100 and all NR_ports in the global fabric. The global fabric includes all edge fabrics and backbone fabrics. A routing decision is calculated independently by each Fibre Channel router 100 based on the full database of NR_ports. For certain embodiments each Fibre Channel router 100 maintains a full record of all Fibre Channel router 100 in the same backbone fabric 150 and the routing decision is simplified to use of a simple round-robin algorithm in case multiple NR_ports exist to a destination edge fabric. The algorithm includes the S_ID, D_ID, and OX_ID of the exchange. In other cases however, when the algorithm only accounts for S_ID and D_ID. This operational model is very similar to how FSPF works. Major differences are:

A Fibre Channel router 100 maintains only Fibre Channel routers 100 as nodes, not all switches in the path. However, within a backbone fabric 150, path selection between NR_ports is done by FSPF.

A Fibre Channel router 100 maintains information outside of its local backbone fabric. All Fibre Channel routers 100 in the global fabric share and maintain the information in certain implementations.

A Fibre Channel router 100 maintains information based on a version stamp, unlike FSPF which maintains a database based on aging and incarnation number.

The NR_port database is maintained based a on version stamp. Once an EX_port successfully establishes a connection to an edge fabric, the EX_port compares the fabric tag and Principal switch WWN of the edge fabric against a NR_port database. The NR_port database contains a list of Fibre Channel routers 100, which are called the router node entries. A router node contains a router node ID, which consists of the fabric tag and domain ID of the Fibre Channel router 100 the node represents; a version stamp; and a list of NR_port entries. An NR_port entry contains the NR_port's Port ID, destination fabric tag, Principal Switch WWN of the destination fabric and link cost. If the newly online EX_port's fabric tag and Principal Switch WWN do not match existing information in the database, the EX_port is disabled and an error message is provided to notify that the EX_port has been disabled because of the fabric tag conflict or over-subscription. If the newly online EX_port's information matches with the existing information in the database or such information does not exist, a new NR_port is added with a current version stamp and updates are sent to all Fibre Channel routers 100 in the global fabric.

When an EX_port receives a Fibre Channel frame that is destined for another fabric, a destination domain ID is used to first identify the destination fabric. Then a list of NR_port entries is searched to determine available NR_ports for the destination edge fabric.

Certain implementations limit the number of router node entries per Fibre Channel router 100 at 256 and the number of NR_port entries per node at 256 and the cost is fixed at 1000, but other implementations can have different limits.

Once an EX_port comes online, it sends out a FCR_B-B_ALIVE at a short fixed interval, such as five seconds, to all valid domains within a backbone fabric 150. The rate of FCR_BB_ALIVE messages sent is slowed, for example, to one minute over time unless other Fibre Channel routers 100 come online within the backbone fabric 150. The FCR_B-B_ALIVE message is used to discover all Fibre Channel routers 100 within a backbone fabric 150 and to check to see if all of them have the same fabric tag. If a Fibre Channel router 100 contains a fabric tag that mismatches the rest of the backbone fabric 150, it does not impede normal Fibre Channel router 100 operation for the switch. However, the Fibre Channel router 100 is not able to route Fibre Channel frames through the backbone fabric 150 using other fabric-tag-mismatching Fibre Channel routers 100.

Once a new Fibre Channel router 100 with a matching fabric tag is discovered, the local Fibre Channel router 100 sends its own NR_port node entry as a database update. The newly online Fibre Channel router 100 responds with an acknowledgment. Anytime a router node entry that belongs to a Fibre Channel router 100 is updated, a database update is sent to all known Fibre Channel routers 100 in the backbone fabric 150 with a matching fabric tag. If no acknowledgment has been received and a FCR_BB_ALIVE message has been received from the switch, the database update is considered lost and the update is retransmitted. If no FCR_BB_ALIVE message has been received from a known Fibre Channel router 100 while a Fibre Channel router 100 has sent out four FCR_BB_ALIVE messages or a domain unreachable RSCN for the known Fibre Channel router 100 has been received, the known Fibre Channel router 100 is considered offline and the router node entry is removed from NR_port database.

Once an EX_port successfully establishes a connection to an edge fabric, the EX_port is now ready for validation. A search is initiated through a NR_port database to see if the Principal switch WWN and fabric tag of the newly online EX_port conflicts with existing information in the database. If there is a conflict, it means that the newly online EX_port is using the same fabric tag used by another edge fabric or the same fabric is taking up another fabric tag. In such case, the EX_port is disabled to stop further participation and an error message provided. The port state of the EX_port is Reset. If there are no conflicts, the information is added to the NR_port database. Following is the algorithm to add the information to the database:

If the router node does not exist, a new router node is added based on the local backbone fabric tag and the local Fibre Channel router 100 domain ID. The entry contains zero NR_port entries and the router node entry is version stamped based on the local Fibre Channel router 100 version stamp counter. A new NR_port entry is added if an entry does not already exist for the new EX_port that came online. The number of the NR_port field is incremented by one. The fabric tag field is set to the edge fabric tag. The Port ID field is set to the local EX_Port Port ID. The Cost field is fixed at 1000. The router node entry is version stamped based on the local Fibre Channel router 100 version stamp counter. An update is sent to all Fibre Channel routers 100 in the global fabric.

Figure 12:
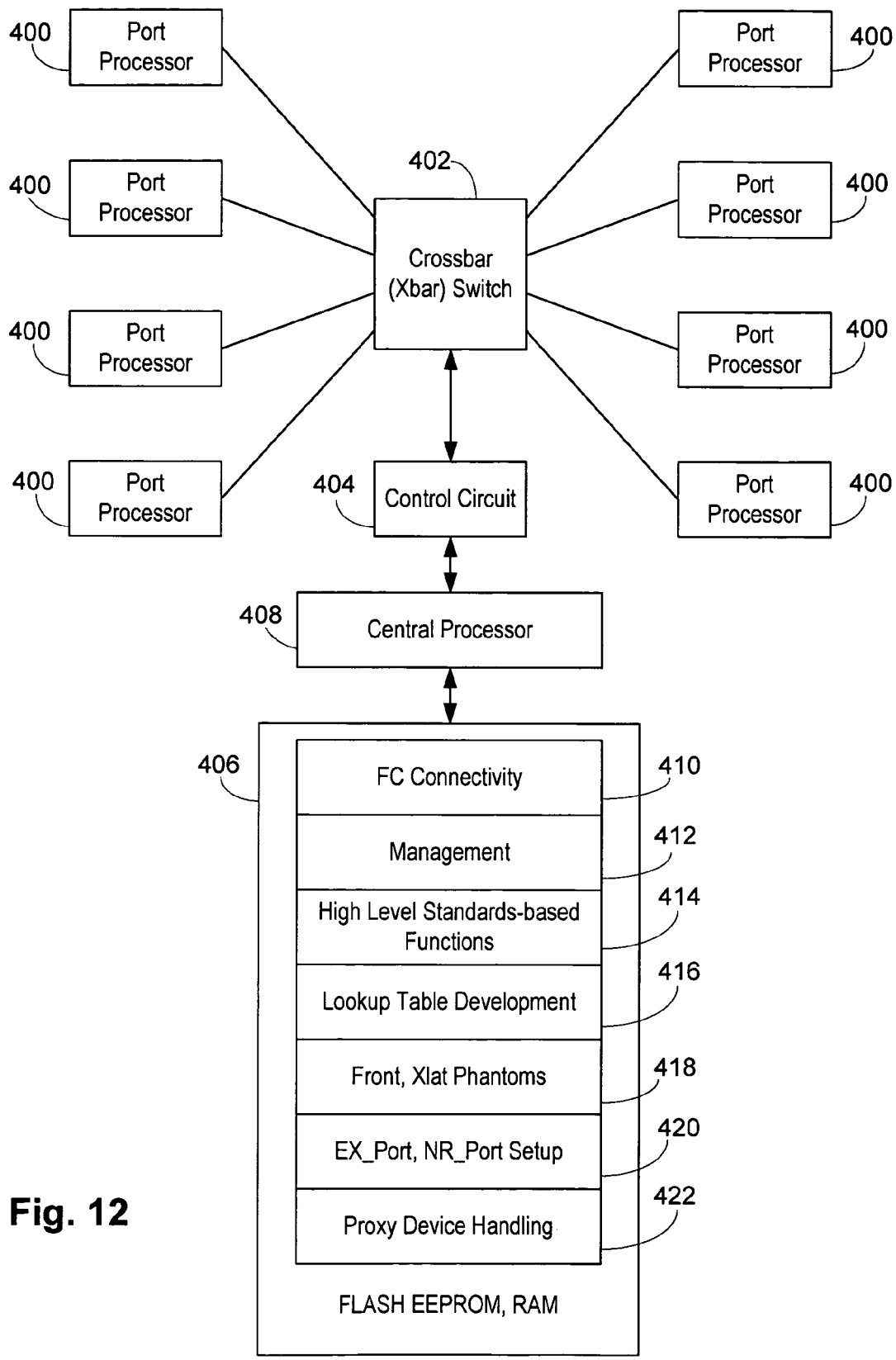
FIG. 12 is a block diagram of various components of a Fibre Channel router according to the present invention.

Many of the functions performed by the Fibre Channel router 100 according to the preferred embodiment a set of port processors 400 and a central processor 408 (FIG. 12). Each port processor 400 can operate as both an ingress port and an egress port. A crossbar switch 402 links the port processors 400. A control circuit 404 connects the central process or 408 to the crossbar switch 402 to allow the central processor 408 to control the crossbar switch 402 and to provide a link to the port processors 400. Memory 406, which stores a set of executable programs, is connected to the central processor 408.

In particular, the memory 406 stores Fibre Channel connectivity software 410; a management software 412; a set of industry standard applications 414; lookup table development software 416, used to develop the lookup tables used in the port processors 400; front and translate phantom domain software 418; EX_port and NR_port setup software 420 and software used to develop and handle any high level commands for the various phantom or proxy devices.

It is also noted that a number of the functions associated with some of this software are partially performed on the port processors 400 in conjunction with the central processor 408. For example, the port processors 400 include hardware and software to work with the lookup tables to translate the addresses and develop the particular fabric IDs to allow the translation of frame addresses and development of interfabric and encapsulation headers.

Figure 13:
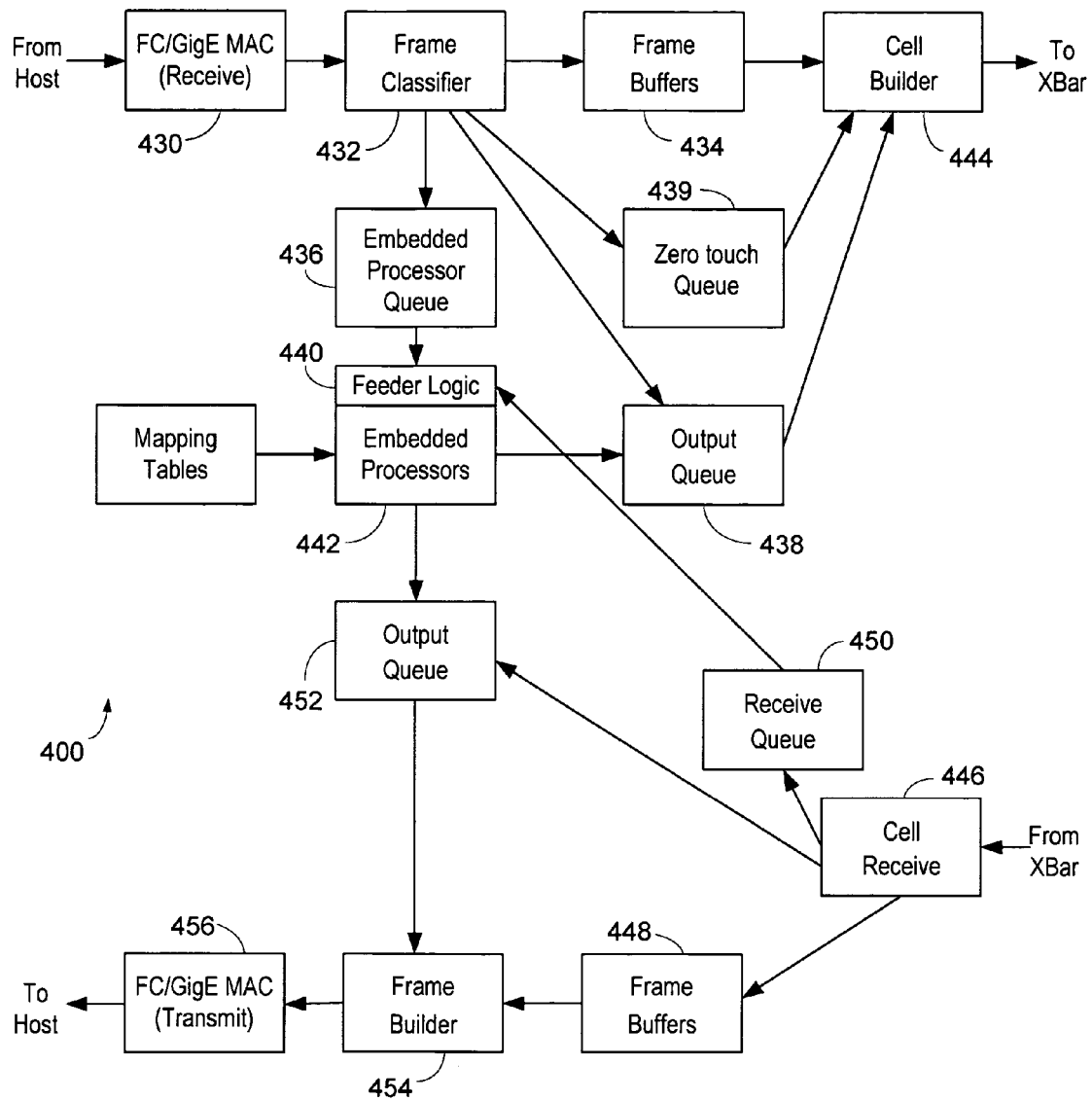
FIG. 13 is a block diagram of the preferred embodiment of a port processor of FIG. 2.

FIG. 13 is a simplified illustration of a port processor 400. Each port processor 400 includes Fibre Channel and Gigabit Ethernet receive node 430 to receive either Fibre Channel or IP traffic. The use of Fibre Channel or Ethernet is selectable for each port processor. The receive node 430 is connected to a frame classifier 432. The frame classifier 432 provides the entire frame to frame buffers 434, preferably DRAM, along with a message header specifying internal information such as destination port processor and a particular queue in that destination port processor. This information is developed by a series of lookups performed by the frame classifier 432.

Different operations are performed for IP frames and Fibre Channel frames. Only Fibre Channel operations are described here For an explanation of IP frame operation, please refer to U.S. patent application Ser. No. 10/695,625, entitled "Apparatus and Method for Storage Processor with Split Data and Control Paths", filed Oct. 28, 2003, which is incorporated by reference. For Fibre Channel frames the SID and DID values in the frame header are used to determine the destination port, any zoning information, a code and a lookup address. The F_CTL, R_CTL, OXID and RXID values, FCP_CMD value and certain other values in the frame are used to determine a protocol code. This protocol code and the DID-based lookup address are used to determine initial values for the local and destination queues and whether the frame is to by processed by the control module, an ingress port, an egress port or none. The SID and DID-based codes are used to determine if the initial values are to be overridden, if the frame is to be dropped for an access violation, if further checking is needed or if the frame is allowed to proceed. If the frame is allowed, then the control module, ingress, egress or no port processing result is used to place the frame location information or value in the embedded processor queue 436 for ingress cases, an output queue 438 for egress and control module cases or a zero touch queue 439 for no processing cases. No interfabric frames would be placed in the zero touch queue 439 because of the required address translations and header operations. Generally control frames would be sent to the output queue 438 with a destination port specifying the control circuit 404 or would be initially processed at the ingress port. Fast path operations, such as frame switching, address translation and/or header development or removal, could use any of the three queues, depending on the particular frame.

Frame information in the embedded processor queue 436 is retrieved by feeder logic 440 which performs certain operations such as DMA transfer of relevant message and frame information from the frame buffers 434 to embedded processors 442. This improves the operation of the embedded processors 442. The embedded processors 442 include firmware, which has functions to correspond to some of the executable programs illustrated in memory 406 of FIG. 12. In the preferred embodiment three embedded processors are provided but a different number of embedded processors could be utilized depending on processor capabilities, firmware complexity, overall throughput needed and the number of available gates. In various embodiments this includes firmware for determining and re-initiating SCSI I/Os; implementing data movement from one target to another; managing multiple, simultaneous I/O streams; maintaining data integrity and consistency by acting as a gate keeper when multiple I/O streams compete to access the same storage blocks; performing address translations; performing header development or removal; and handling updates to configurations while maintaining data consistency of the in-progress operations.

When the embedded processor 442 has completed ingress operations, the frame location value is placed in the output queue 438. A cell builder 444 gathers frame location values from the zero touch queue 439 and output queue 438. The cell builder 444 then retrieves the message and frame from the frame buffers 434. The cell builder 444 then sends the message and frame to the crossbar 402 for routing based on the destination port value provided in the message.

When a message and frame are received from the crossbar 402, they are provided to a cell receive module 446. The cell receive module 446 provides the message and frame to frame buffers 448 and the frame location values to either a receive queue 450 or an output queue 452. Egress port processing cases go to the receive queue 450 for retrieval by the feeder logic 440 and embedded processor 442. No egress port processing cases go directly to the output queue 452. After the embedded processor 442 has finished processing the frame, the frame location value is provided to the output queue 452.

A frame builder 454 retrieves frame location values from the output queue 452 and changes any frame header information based on table entry values provided by an embedded processor 442. The message header is removed and the frame is sent to Fibre Channel and Gigabit Ethernet transmit node 456, with the frame then leaving the port processor 400.

Figure 14:
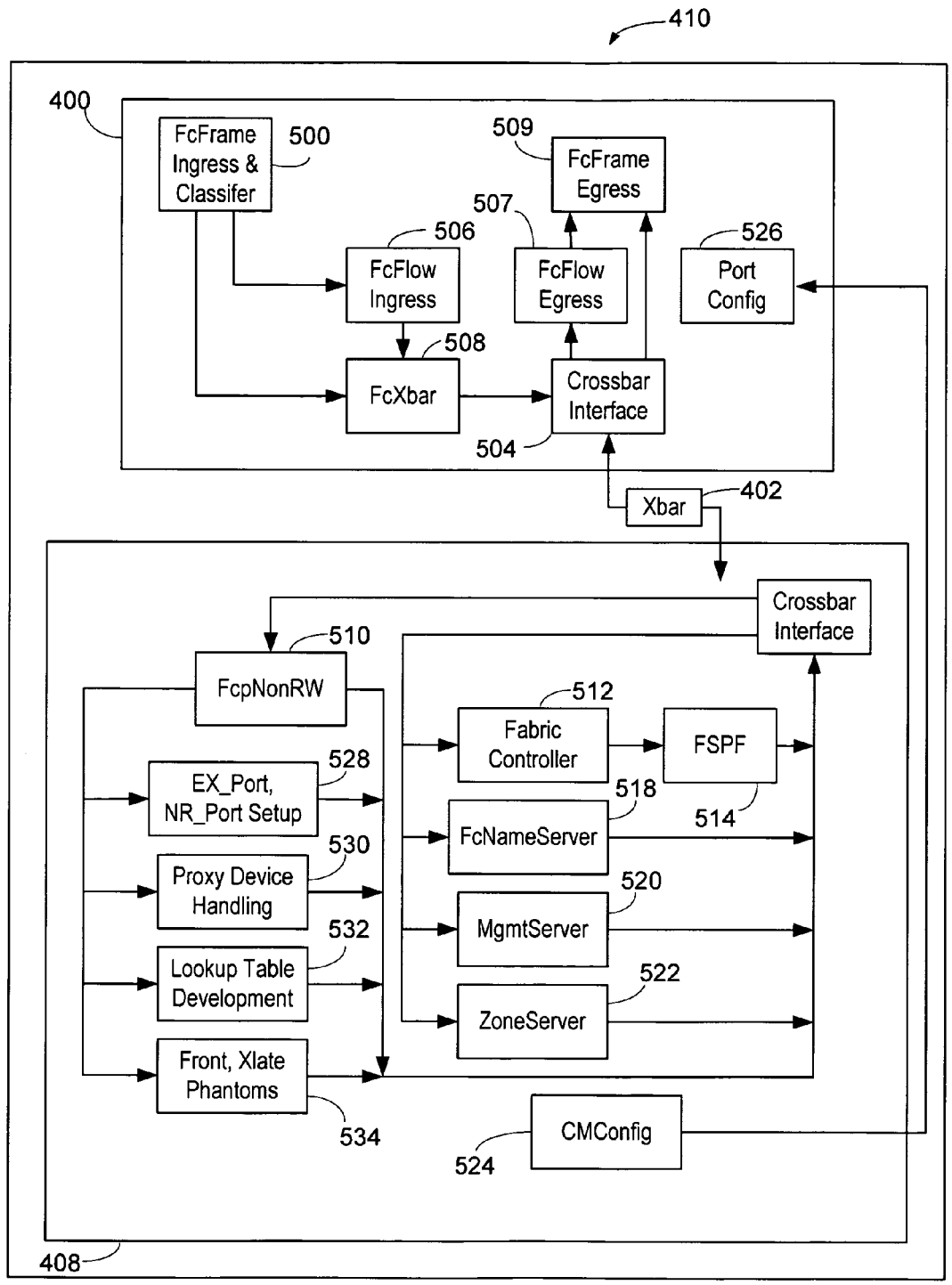
FIG. 14 is block diagram of the various software modules executing on the port processors and central processor of FIG. 12.

The embedded processors 442 thus include both ingress and egress operations. In the preferred embodiment, multiple embedded processors 442 perform ingress operations, preferably different operations, and at least one embedded processor 442 performs egress operations. The selection of the particular operations performed by a particular embedded processor 442 can be selected using device options and the frame classifier 432 will properly place frames in the embedded processor queue 436 and receive queue 450 to direct frames related to each operation to the appropriate embedded processor 442. In other variations multiple embedded processors 442 will process similar operations, depending on the particular configuration As previously indicated, various functions are distributed between the port processor 400 and the central processor 408. Each port processor 400 implements many of the required functions. This distributed architecture is more fully appreciated with reference to FIG. 14. FIG. 14 illustrates the implementation of the Fibre Channel connectivity software 410. As shown in FIG. 14, the control processor 408 implements various functions of the Fibre Channel connectivity software 410 along with the port processor 400.

In one embodiment according to the invention, the Fibre Channel connectivity software 410 conforms to the following standards: FC-SW-2 fabric interconnect standards, FC-GS-3 Fibre Channel generic services, and FC-PH (now FC-FS and FC-PI) Fibre Channel FC-0 and FC-1 layers. Fibre Channel standard connectivity is provided to devices using the following: (1) F_port for direct attachment of N_port capable hosts and targets, (2) FL_port for public loop device attachments, and (3) E_port for switch-to-switch interconnections. Selected EX_port and NR_port connectivity is handled in this software.

In order to implement these connectivity options, the apparatus implements a distributed processing architecture using several software tasks and execution threads. FIG. 14 illustrates tasks and threads deployed on the control module and port processors. The data flow shows a general flow of messages.

An FcFrameIngress task 500 is a thread that is deployed on a port processor 400 and is in the datapath, i.e., it is in the path of both control and data frames. Because it is in the datapath, this task is engineered for very high performance. It is a combination of port processor core, feeder queue (with automatic lookups), and hardware-specific buffer queues. It corresponds in function to a port driver in a traditional operating system. Its functions include: (1) serialize the incoming fibre channel frames on the port, (2) perform any hardware-assisted auto-lookups, particularly including frame classification, (3) queue the incoming frame, and (4) develop or remove any additional headers.

Most frames received by the FcFrameIngress task 500 are placed in the embedded processor queue 436 for the FcFlowIngress task 506. However, if a frame qualifies for "zero-touch" option, that frame is placed on the zero touch queue 439 for the crossbar interface 504. The frame may also be directed to the central processor 408 in certain cases. These cases are discussed below. The FcFlowIngress task 506 is deployed on each port processor in the datapath. The primary responsibilities of this task include:

1. Dispatch any incoming Fibre Channel frame from other tasks (such as, FcpNonRw) to an FcXbar thread 508 for sending across the crossbar interface 504.
 2. Allocate and de-allocate any exchange related contexts.
 3. Perform any Fibre Channel frame translations.
 4. Update usage and related counters.
 5. Develop any interfabric or encapsulation headers.

The FcXbar thread 508 is responsible for sending frames on the crossbar interface 501. In order to minimize data copies, this thread preferably uses scatter-gather and frame header translation services of hardware. This FcXbar thread 508 is performed by the cell builder 444.

Frames received from the crossbar interface 504 that need processing are provided to an FcFlowEgress task 507. The primary responsibilities of this task include:

1. Perform any Fibre Channel frame translations.
 2. Update usage and related counters.

If no processing is required or after completion by the FcFlowEgress task 507, frames are provided to the FCFrameEgress task 509. Essentially this task handles transmitting the frames and is primarily done in hardware, including the frame builder 454 and the transmit node 456.

An FcpNonRw task 510 is deployed on the central processor 408. The primary responsibilities of this task include:

1. Analyze FC frames that are not Read or Write (basic link service and extended link service commands).
 2. Keep track of error processing.

A Fabric Controller task 512 is deployed on the central processor 408. It implements the FC-SW-2 and FC-AL-2 based Fibre Channel services for frames addressed to the fabric controller of the switch (D_ID 0xFFFFFD as well as Class F frames with PortID set to the DomainId of the switch). The task performs the following operations for each domain in the Fibre Channel router 100, either real or phantom:

1. Selects the principal switch and principal inter-switch link (ISL).
 2. Assigns the domain id for the switches.
 3. Assigns an address for each port.
 4. Forwards any SW_ILS frames (Switch FSPF frames) to the FSPF task.

A Fabric Shortest Path First (FSPF) task 514 is deployed on the control module 202. This task receives Switch ILS messages from the FabricController 512 task. The FSPF task 514 implements the FSPF protocol and route selection algorithm. It also distributes the results of the resultant route tables to all exit ports of the switch.

An FcNameServer task 518 is also deployed on the control module 202. This task implements the basic Directory Server module as per FC-GS-3 specifications. The task receives Fibre Channel frames addressed to 0xFFFFFC and services these requests using the internal name server database. This database is populated with Initiators and Targets as they perform a Fabric Login. Additionally, the Name Server task 518 implements the Distributed Name Server capability as specified in the FC-SW-2 standard. The Name Server task 518 uses the Fibre Channel Common Transport (FC-CT) frames as the protocol for providing directory services to requestors. The Name Server task 518 also implements the FC-GS-3 specified mechanism to query and filter for results such that client applications can control the amount of data that is returned.

A management server task 520 implements the object model describing components of the switch. It handles FC Frames addressed to the Fibre Channel address 0xFFFFFA. The task 520 also provides in-band management capability. The module generates Fibre Channel frames using the FC-CT Common Transport protocol.

A zone server 522 implements the FC Zoning model as specified in FC-GS-3. Additionally, the zone server 522 provides merging of fabric zones as described in FC-SW-2. The zone server 522 implements the "Soft Zoning" mechanism defined in the specification. It uses FC-CT Common Transport protocol service to provide in-band management of zones. Further discussion on multiple fabric zoning is provided below with respect to FIG. 20.

A CMConfig task 524 performs the following operations:
 1. Maintain a consistent view of the switch configuration in its internal database.
 2. Update ports in I/O modules to reflect consistent configuration.
 3. Update any state held in the I/O module.
 4. Update the standby control module to reflect the same state as the one present in the active control module.

As shown in FIG. 14, the CMConfig task 524 updates a PortConfig task 526. The PortConfig task 526 is a thread deployed on the port processor 400. The task 524 performs the following operations:
 1. Update of any configuration tables used by other tasks in the port processor, such as the frame classification and access control tables. This update shall be atomic with respect to other ports.
 2. Ensure that any in-progress I/Os reach a quiescent state.

The FcpNonRW task 510 forwards certain frames to various other tasks for specialized functions related to the routing capabilities of the Fibre Channel router 100. A first task is the EX_port and NR_port setup task 528. While the lower level capabilities and initialization of EX_ports and NR_ports are performed by initialization software based on operator-defined values indicating a particular port is an EX_port/NR_port, higher level functions are performed by the setup task 528 when devices that may use the specific port are identified. Thus the setup task cooperates with a lookup table development task 532 and a front and translate phantom task 534. For example, the NR_port discovery described above is handled in the setup task 528.

The lookup table development task 532 provides the necessary entries in the port processor mapping tables. Entries are provided as devices and fabrics are connected or removed. The entries provide the information necessary to perform address translations and interfabric and encapsulation header development.

The front and translate phantom task 534 receives the frames directed to higher level operations, such as management and standards-based, for the front and translate phantom domains. Many of these operations are described above. These operations include:
 1. Fabric Services for the phantom domains.
 2. ILS handling.
 3. Port management.
 4. Other EX_port and NR_port tasks.

An additional task is the proxy device handling task 530. Proxy devices are treated as being connected to the translate phantom domain by loops. As described above, the translate phantom domains can use ports 0 to 238 to connect to front phantom domains (there being a maximum of 239 domains in fabric), ports 239 to 255 are available to be used for proxy devices. In the preferred embodiment each loop can contain 127 AL_PAs or devices for simplicity, through 255 AL_PAs could be used if defined. Therefore the preferred embodiment allows the connection of 2,159 devices for interfabric communication, though 4,335 devices could be used if all 255 AL_PAs are used. The proxy handling task 530 cooperates with the zone server task 522 to assign addresses to the proxy devices and with the lookup table development task 532 to incorporate these device addresses into the table.

It is understood that the tasks 512, 518, 520 and 522 can operate centrally for all relevant domains, such as those of the Fibre Channel router 100 acting as a level two switch and the various phantom domains, or multiple instances can be used to handle different groups of domains, such as the Fibre Channel router 100 itself and the various phantom domains, or can handle each domain individually. Thus the tasks shown in the central processor 408 are to illustrate the functions to be performed and the actual instances of relevant software can be varied as desired.

Referring then to FIG. 15, this is a flow chart of the operation of the ARM processor embedded processor 442 of an EX_port. For a further explanation of the operation of embedded processors 442 and division of tasks between fast path and control or slow path, refer to application Ser. No. 10/695,625 referenced above. In Step 700 a frame is received which is directed to a proxy device. In step 702 the hardware in the port processor 400 retrieves the final DID and the destination fabric values and in step 704 the embedded processor performs a hash on the SID, DID and OXID, which allows exchange-based load balancing, and performs a table lookup to obtain the destination port in the Fibre Channel router 100. In step 706 the embedded processor 442 develops the various port IDs and translates the frame header entries needed to correctly address the source and destination devices according to the translate phantoms present and the particular end of frame and port IDs necessary to traverse the backbone 150. In step 708 the processor builds the fabric routing header and the encapsulation header and appends those to the packet. In step 710 the frame is sent from the port processor 400 for routing to the receiving port or egress port.

FIG. 16 is a similar flowchart for embedded processor 442 operation at the NR_port. There are preferably multiple embedded processors 442 in each port processor 400 so that in step 800 the embedded processor 442 receives the frame from the remote fabric i.e. the frame that had been developed by the EX_port processor. In step 802 the embedded processor 442 performs a proxy source ID look-up based on the source fabric ID and real SID and provides this information to the second embedded processor 442 in the port processor 400. In step 804 the embedded processor 442 removes the fabric routing header and encapsulation header and then in step 806 translates the frame header entries as necessary based on the proxy device and target device. Then in step 808 it sends the frame into the destination fabric for routing to the destination device. Thus the operations utilized to perform the translations and headers development and removal are relatively simplistic and can be performed at full wire speed.

It is noted that the EX_port uses ARM1 and the NR_port uses ARM 2. Thus the port can readily be both an EX_port and an NR_port in the preferred embodiment because different embedded processors are used.

Figure 17:
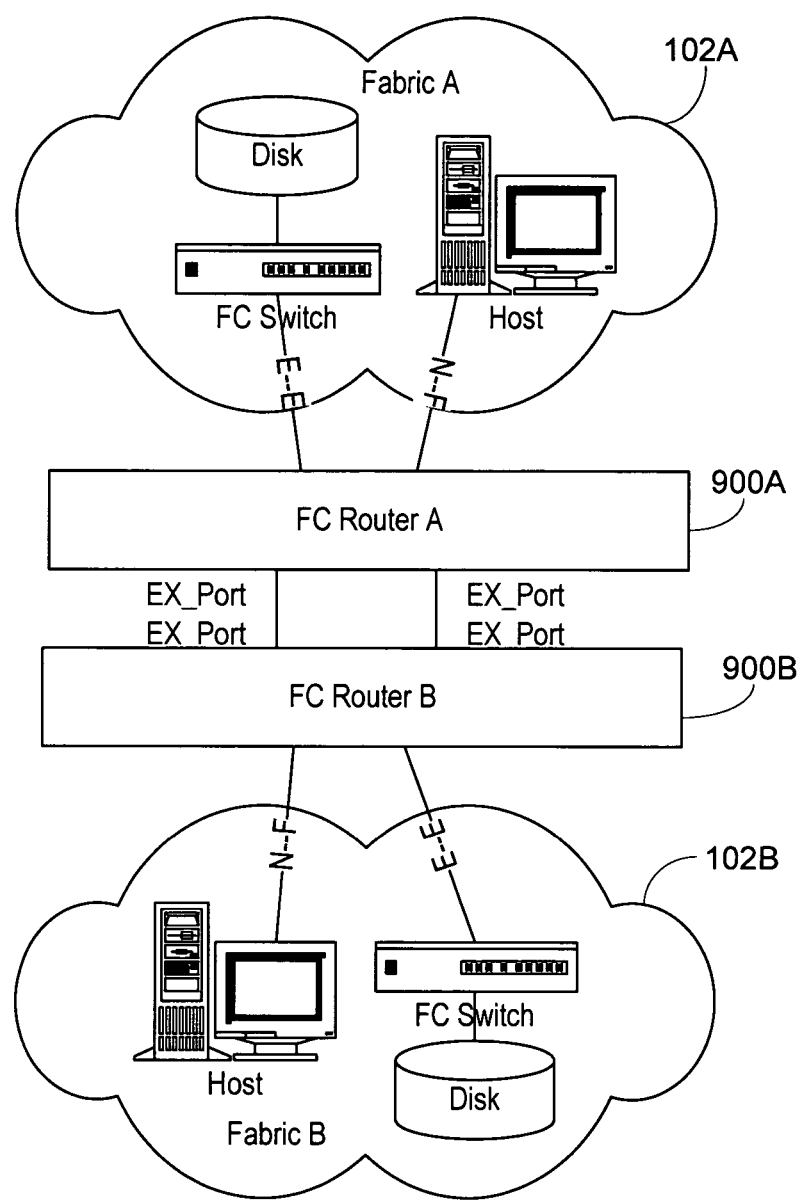
FIG. 17 is an alternate embodiment illustrating the interconnection of Fibre Channel routers according to the present invention where the Fibre Channel routers are connected to the fabrics and are connected to each other.

An alternate embodiment is shown in FIG. 17. Fibre Channel routers 900 are interconnected to allow connection of two fabrics. In the illustrated embodiment a first Fibre Channel router A 900A connected via EX_ports to a Fibre Channel router B 900B. Fibre Channel router A 900A is connected to a fabric A 102A through E_ports to switches and F_ports to nodes. Similarly the Fibre Channel router B 900B is connected to a fabric B 102B through F_ports and E_ports to the various devices in the fabric B 102B. Routing between fabrics 102A, 102C and 102D would be handled by Fibre Channel router A 900A, while between fabrics 102/B, 102E and 102F would be handled by Fibre Channel B 900B. Routing from any of fabrics 102A, 102C, 102B, 102E or 102F would be done using both Fibre Channel routers A and B 900A and 900B. This configuration provides additional fault isolation between the connected fabrics but also requires an additional Fibre Channel router.

Figure 18:
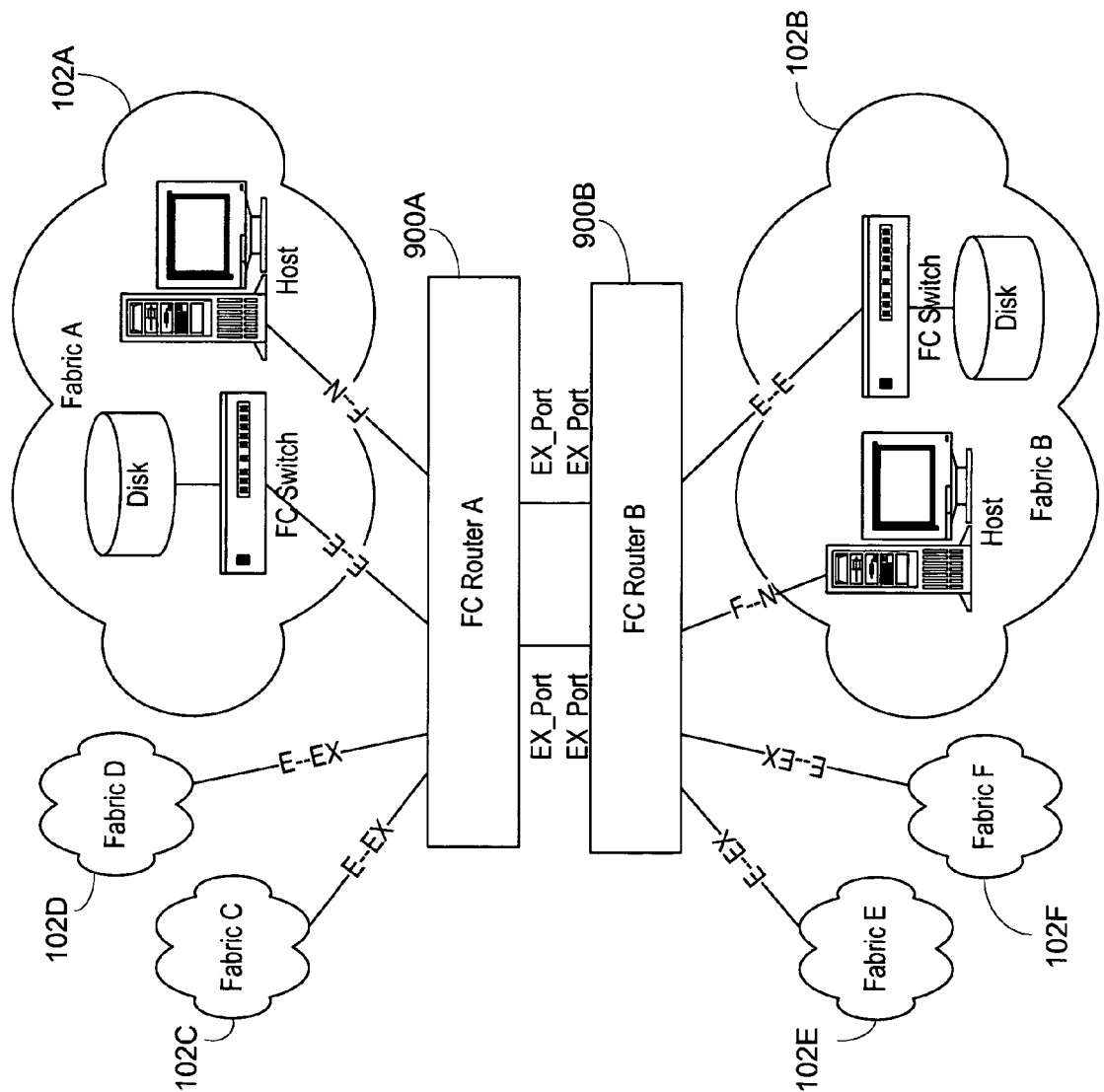
FIG. 18 is the embodiment of FIG. 17 with multiple fabrics being interconnected.

FIG. 18 illustrates that the Fibre Channel routers A and B 900A and 900B can actually connect to multiple fabrics such as 102A, 102C and 102D in the illustrated case for Fibre Channel router A 900A and fabrics 102B, 102E and 102F for Fibre Channel router B 900B.

Figure 19:
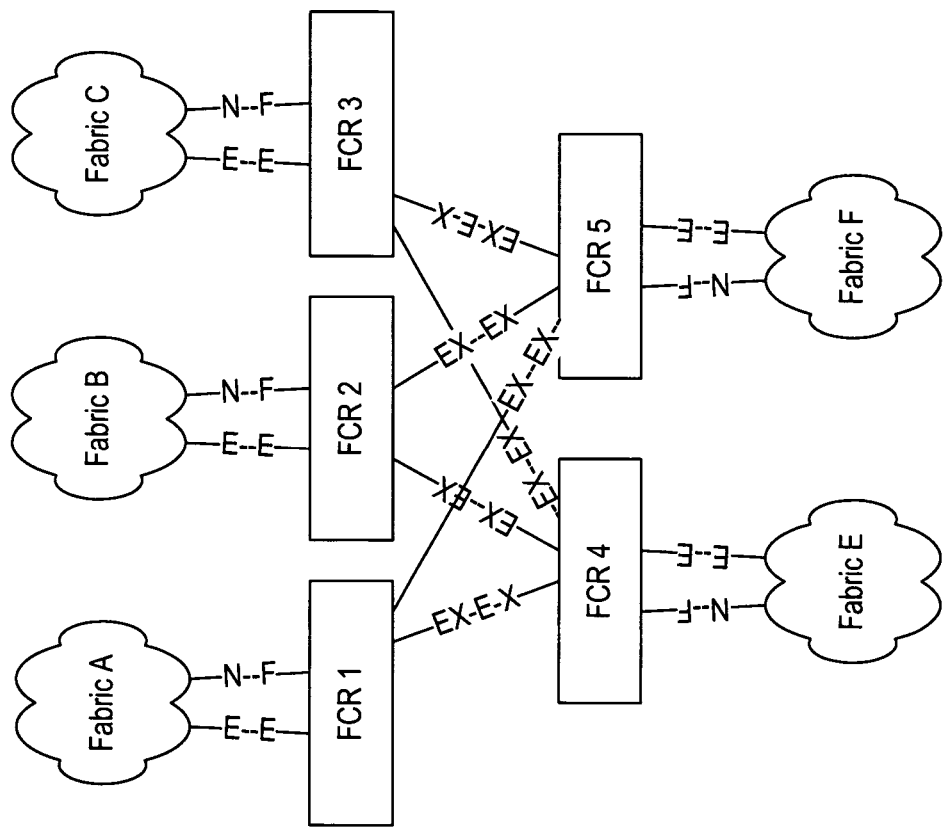
FIG. 19 is an illustration of a plurality of Fibre Channel routers of FIG. 17 interconnection a plurality of fabrics.

FIG. 19 is a fabric interconnection illustration using this particular interconnection of the Fibre Channel routers for a more complicated environment.

The primary method for managing inter-fabric device sharing is via World Wide Name (WWN) zoning. In this scheme, users create zones at each edge fabric using normal zoning management interfaces available at each edge fabric. Thus no changes to the zoning interfaces present in standard Fibre Channel devices are required. However, for inter-fabric device sharing, the inter-fabric zones have a special name according to the following convention: they are named "LSAN_XYZ", where XYZ represents a user-defined string. The LSAN tag in the zone name indicates to the Fibre Channel router that the zone is a special, inter-fabric zone.

The WWNs of the devices being used in inter-fabric device sharing are the elements of these special zones, known as "LSAN Zones". The WWNs contained in these zones may exist on the local edge fabric (the local edge fabric where the zone is created) or may exist in another fabric. WWNs in the LSAN zones that exist in the local edge fabric are devices intended for export to another fabric, and WWNs that exist in another fabric represent devices intended for import into this local edge fabric.

Fibre Channel routers 100 obtain the zoning database from each edge fabric and parse the database for zones with the special "LSAN" tag in the zone name. Each LSAN zone database entry consists of the LSAN zone name, a list of port WWNs, and a device state record. The special prefix is preferably case insensitive so "LSAN_" and "lsan_" are both valid, as well as other capitalization schemes. The Fibre Channel router 100 compares the WWNs from the special zones from a particular fabric with entries from another fabric. Matching entries define which devices can communicate via Fibre Channel router(s) 100 across fabrics. These devices are considered to be in the same LSAN.

The LSAN zone database and device database are preferably organized as fixed size arrays. However, to support fast lookup of device entries and finding of two zoned entries in another fabric, hash tables of the device database organized based on port WWN and on fabric ID combined with port WWN are implemented. The hash implementation allows the Fibre Channel router 100 to handle a large number of device state changes and speeds up import/export checking.

The LSAN zone database maintained by the Fibre Channel router 100 breaks down into two different entry types: edge LSAN zone entries and backbone LSAN zone entries. Edge LSAN zone entries are created based on edge fabrics' active zone entries, and may be further divided into two additional types: local and remote. Local edge LSAN zone entries are created based on edge fabrics directly connected to a Fibre Channel router 100. Remote edge LSAN zone entries are cached entries from other Fibre Channel routers' local entries. Backbone LSAN zone entries are created based on a backbone fabrics' active zone entries and may also be further divided into local and remote types. Local backbone LSAN zone entries are created based on backbone fabrics directly connected to the Fibre Channel router, while remote backbone LSAN zone entries are cached of entries from other backbones.

Local edge LSAN zone entries are created through zone operations between an edge fabric and a front phantom. When an edge fabric connects to an EX_Port, it sends the full zoning database as part of "merging" process with a front phantom created by the EX_Port. The zone entries with names that start with the special tag are converted to local LSAN zone entries. Local LSAN zone entries are maintained based on other subsequent zone operations, such as create, delete, etc., initiated by the edge fabric.

Remote edge LSAN zone entries are created through Fibre Channel routers 100 connected to the same backbone exchanging local edge LSAN zone entries. Once Fibre Channel routers 100 discover one another, they initiate full database exchange and subsequently follow with updates to maintain a completely synchronized database across all Fibre Channel routers 100 within the same backbone. Updates are sent with the full LSAN zone entry and are acknowledged by another Fibre Channel router 100 with LSAN zone name and version stamp. Backbone LSAN zone entries are exchanged between backbone fabrics through a Fibre Channel router 100 protocol. The exchange involves initial LSAN zone database exchange when two EX_Ports are established, then subsequently followed by updates.

The LSAN zone databases are used by the Fibre Channel router 100 to determine import/export requirements for mapping phantom devices into the external fabric with which they are communicating. The import/export condition is quite simple. When two fabrics contain a matching LSAN zone pair, and each fabric contains one of two devices, the Fibre Channel router 100 imports/exports each device to the remote fabrics. For example, fabric A contains device DA and fabric B contains device DB. Fabric A contains an LSAN zone entry that allows DA and DB to talk to each other, and fabric B contains an LSAN zone entry that allows the same. Once it has been verified that both fabrics allow two devices to communicate with each other and both devices are online in their respective fabrics, the Fibre Channel router 100 imports/exports device DB to fabric A and device DA to fabric B.

Figure 20:
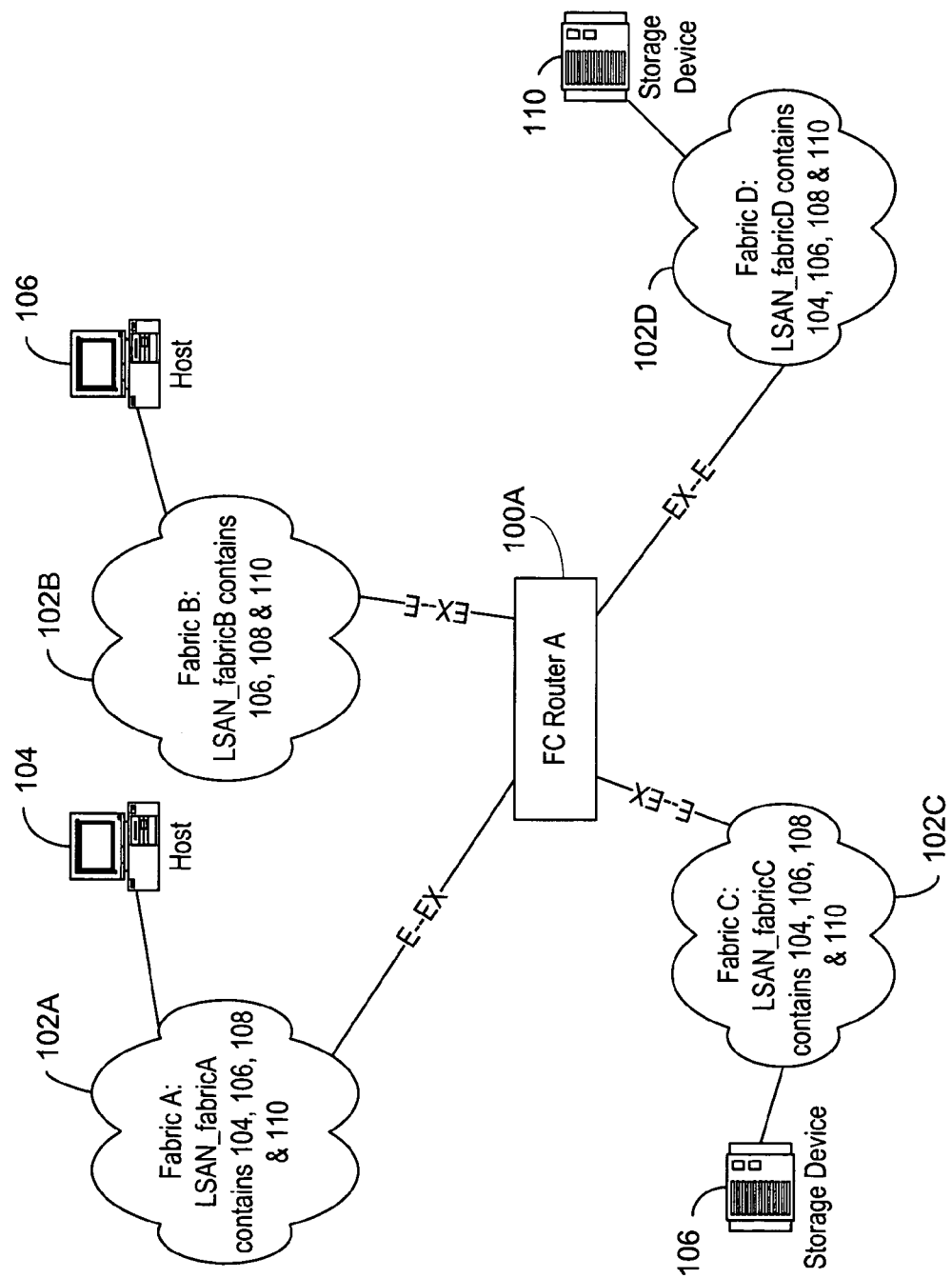
FIG. 20 is an illustration of multiple fabric zoning according to the present invention.

Better understanding of this scheme may be understood with reference to FIG. 20, which contains four fabrics: fabric A 102A, fabric B 102B, fabric C 102C, and fabric D 102D. The fabrics are interconnected by Fibre Channel router FCR100A. Fabric A 102A contains host 104. Similarly, fabric B 102B and fabric D 102D contain host 106 and storage device 110, respectively. Fabric C 102C contains a storage device 108. In fabric A 102A, an LSAN zone LSAN_fabricA is defined that includes host 104, host 106, and storage device 110. Similarly, in fabric C 102C, an LSAN zone LSAN_fabricC is defined that also contains host 104, host 106, storage device 108 and storage device 110. The Fibre Channel router 100A connecting these two zones will compare the contents of the LSAN zones and will allow communication between host 104 and storage device 108 because these elements are common to the defined LSAN zones. Conversely, in fabric B 102B, an LSAN zone is defined that includes only host 106, storage device 108 and storage device 110. Thus host 106 will be able to communicate with storage device 106 in fabric C 102C, but host 106 will not be allowed to communicate with host 104 in fabric A 102A because there is no overlapping LSAN zone that includes hosts 104 and 106.

It is important to note several things about this zoning scheme. First, the user defined (i.e., "XYZ") portion of the LSAN zone name from one fabric does not have to match the user-defined portion of the LSAN zone name from another fabric for devices to be included in the same LSAN. Hence LSAN_fabricA and LSAN_fabricC allow communication between the identified components. Second, this zoning scheme is intended to work with real zones in the edge fabrics and the devices that exist in these zones are subject to normal zoning enforcement by the switches in the fabric. Additionally, LSAN zones must be World Wide Name zones and cannot be any other type of zone (e.g., port zones, etc.) Finally, no special firmware (assuming WWN zoning is supported) is required in the edge fabrics to enable this inter-fabric device sharing management model.

The zoning example discussed above is advantageous in a network where separate fabrics are each administered by a different administrator. This allows the two administrators to configure inter-fabric communication without releasing control of any aspects of their own fabric. Conversely, in the case where a single administrator has control of all of the edge fabrics, the Super Administrator model provides the capability for a single administrator (i.e., the Super Administrator) to centrally administer the LSANs using a single step process. This is preferably accomplished by a management application that implements a GUI allowing the Super Administrator to drag and drop devices into an LSAN. This management application will then automatically setup LSAN zones in the various fabrics in a behind the scenes process that is transparent to the user. One such management application which could implement this process is Fabric Manager from Brocade Communications.

LSAN zone entries must remain synchronized among Fibre Channel routers 100 to facilitate routing across backbone fabrics 150 and to gracefully recover from Fibre Channel router 100 failures. The protocol for synchronization within a backbone fabric 150 allows for all Fibre Channel routers 100 within a backbone to maintain the latest LSAN zone entries that a Fibre Channel router 100 does not have direct connection to. This allows two Fibre Channel routers 100 within a backbone to synchronize import/export across the backbone fabric 150. Every 5 seconds, a Fibre Channel router daemon runs through local edge LSAN zone entries to see if any entries must be shared with other Fibre Channel routers 100 within a backbone fabric 150. Local edge LSAN zone entries are sent only if: (1) the remote Fibre Channel router 100 belongs to the same backbone fabric as the local Fibre Channel router 100, (2) the remote Fibre Channel router 100 is not directly connected to an edge fabric that created the entries, and (3) the last acknowledge message from the remote Fibre Channel router 100 regarding the LSAN zone entry is older than the current LSAN zone timestamp.

The protocol for synchronization within an edge fabric protocol allows the owner front phantom to maintain a consistent view of device information if the device belongs to an edge fabric that the front phantom owns. As an owner front phantom maintains a translate domain and node WWN consistent within an edge fabric, the owner front phantom is also responsible for maintaining device information, mainly proxy Port ID and device state, within an edge fabric. Every 10 seconds, each Fibre Channel router 100 through local edge LSAN zone entries created by the edge fabric the front phantom is connected to. When it finds a device that imported/exported into a fabric the front phantom owns, the front phantom checks to see if the device information needs to be shared with other front phantoms connected to the same edge fabric. The device information is sent only if the other front phantom is also reachable to the remote fabric where the device resides in and the last ACK from the other front phantom regarding the device is older than the timestamp of the device maintained by the front phantom sending the device information.

As noted above, routing between fabrics requires additional headers to those specified by the Fibre Channel standard. To accomplish inter-fabric routing, a "global header" is inserted into frames to provide Fibre Channel routers 100 in a frame's path with instructions on the source and destination fabric, as well as the source device port ID in the source fabric and the destination device port ID in the destination fabric. This involves adding this global header to Fibre Channel frames to allow unique addressing of devices across multiple interconnected fabrics. A local header, i.e., a normal Fibre Channel header, is used to route within a fabric.

Figure 21:
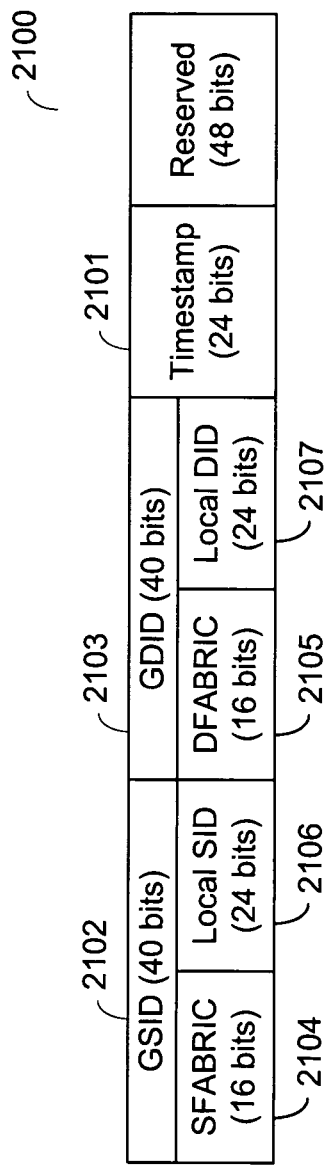
FIG. 21 is a depiction of a global header used in multi-fabric zoning according to the present invention.

The global header 2100, illustrated in FIG. 21, contains a timestamp 2101 and global port identifier fields (GPIDs) that uniquely identify the source (GSID 2102) and destination (GDID 2103) ports of the frame in a connected network of distinct (i.e., not merged) fabrics. In certain embodiments, end devices will insert GPIDs into the global header of a frame to uniquely address devices and switches will use the GPIDs in conjunction with normal (local fabric) PIDs to make routing decisions. Alternatively, for legacy devices that are not capable of global addressing, the Fibre Channel router 100 will have the capability to create the global header on behalf of the legacy devices that are not capable of global addressing.

The timestamp included in the global header indicates the expiration time of a frame. The format of the timestamp could take on a variety of forms, each of which has various advantages and disadvantages, which would be understood by one of ordinary skill in the art. Switches in the data path compare the timestamp with the current time and discard the frame if the current time is beyond the timestamp. Obviously, this requires all switches that enforce the timeout to have synchronized time. Time synchronization is not viewed as problematic because most switches support NTP time synchronization and the synchronization accuracy demands are not very high given that the timeouts are expected to have granularities of seconds or minutes. It is expected that the maximum timeout value will be less than 2 minutes, although other values of the same order of magnitude would also be feasible. Some switches or Fibre Channel routers 100 in the frame's path may check this timestamp and others may not (legacy switches). This frame level timer granularity allows much more flexibility to build complex multi-fabric SANs.

Each GPID (global port identifier field) has two subfields. The upper 16 bits of the GPID will identify a fabric, source fabric (SFABRIC 2104) for a GSID and destination fabric (DFABRIC 2105) for a GDID. The lower 24 bits of the GPID contain the end device local PID, i.e., Local SID 2106 and Local DID 2107. The local PID sub-field in a GSID contains the SID of the end device sending a frame. This SID is the originating end device's PID. This PID is relevant to the local fabric of the originating end device. The local PID sub-field in a GDID contains the DID of the end device that is to receive the frame. This DID is the receiving end device's PID. This PID is relevant to the local fabric of the receiving end device.

Figure 22:
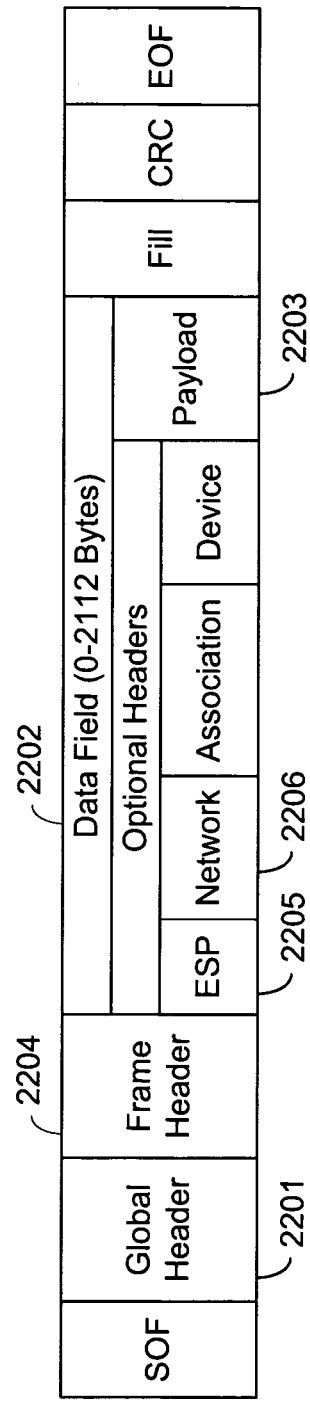
FIG. 22 illustrates a Fibre Channel frame including various inter-fabric routing headers according to the present invention.

Various locations within a Fibre Channel frame are possible for the global header. In one embodiment, the global header 2201 is inserted in the Fibre Channel frame between the start of frame indicator and the frame header 2204. Such a frame is illustrated in FIG. 22. In another embodiment, the global header can be a new Fibre Channel optional header immediately following the standard Fibre Channel header and prior to the frame's payload. In this embodiment, the global header 2201 resides in the data portion 2202 of the Fibre Channel frame 2200 along with the frame's payload 2203. Its presence is indicated by DF_CTL[23] in the Fibre Channel frame header 2204, which is currently a reserved bit. If other optional headers are present (e.g., ESP header 2205, network header 2206, etc.), they will follow the global header if present.

As an alternative to including the global header in the data portion of a Fibre Channel frame, the global header can be an extension to the Fibre Channel frame header (2204, FIG. 22) using R_CTL bits (first field of an FC frame header, described below with reference to FIG. 24) to specify a new frame format. The R_CTL bit format that would specify the presence of the global header could be any of a number of possibilities, all of which could be conceived by one of ordinary skill in the art. This frame format would extend the Fibre Channel frame header size by the length of the global header. The global header would then reside at the end of the frame header. The portion of the header preceding the global header would remain the same format as it is currently to preserve backward compatibility as much as possible. This extended frame header option does not occupy data field bytes, thus allowing more room for payload and overcoming the problems of data field use discussed above.

In the embodiment where the optional header shares the data portion of the frame with the payload, the presence of an optional header effectively reduces the size of the payload. In the current Fibre Channel standard, the data field is limited to 2112 bytes. This limitation may cause an end device to require more frames to send a stream of data. Although it is anticipated that future Fibre Channel devices will be capable of performing global addressing on their own, to support legacy devices, the Fibre Channel router 100 will create the global header on behalf of the legacy devices that are not capable of global addressing. In such a case, there may not be sufficient space in the data field for the optional header if the frame's payload approaches 2112 bytes in length.

One solution to this problem is for the Fibre Channel router 100 to intercept any special frames (e.g., PLOGI) that negotiate payload size between the end device and the proxy device and modify the payload size to ensure sufficient space in the data field for the global header. An alternate solution is for the Fibre Channel router 100 to break the frame into two smaller frames.

The normal Fibre Channel header of the frame contains SID and DID fields. In the originating fabric, the SID is the PID of the end device sending a frame. For an originating end device that is global-header capable, the DID specifies phantom port that appears to reside on originating device's local fabric. This DID effectively provides routing instructions to a fabric to get frames from the originating device to the Fibre Channel router's translation engine. If the end device is a legacy non-global-header capable device, then the DID represents a phantom device created by a Fibre Channel router 100, which is a proxy for a device on a remote fabric. This DID also effectively provides routing instructions to a fabric to get frames from the originating end device to a Fibre Channel router's translation engine.

If the destination end device is global-header capable, the SID is the PID of the Fibre Channel router translation engine, and the DID is the PID of the destination end device that is to receive a frame. If the destination end device is a legacy non-global-header capable device then the SID represents a proxy device created by the Fibre Channel router 100, which is a proxy for the originating device on a remote fabric.

For interfabric routing between fabrics connected by a backbone fabric (e.g., network topologies as in FIG. 5), different, and more, headers are required. The Fibre Channel router 100 described herein requires two new frame headers, the encapsulation header and the fabric routing header and further includes an additional normal header in the frame. These headers are used to pass frames between Fibre Channel routers 100 that are connected to the same backbone fabric 150. Specifically, frames are passed between "NR_Ports" that are exposed by the Fibre Channel routers 100, as described above. These headers are inserted by the ingress EX_Port handler and are interpreted and removed by the egress NR_Port. Although various formats for these headers are possible, one exemplary embodiment is described below. Nonetheless, in a preferred embodiment of the Fibre Channel router 100, frame handling is performed in software, so that format changes can be easily accommodated without requiring major system changes.

Figure 23:
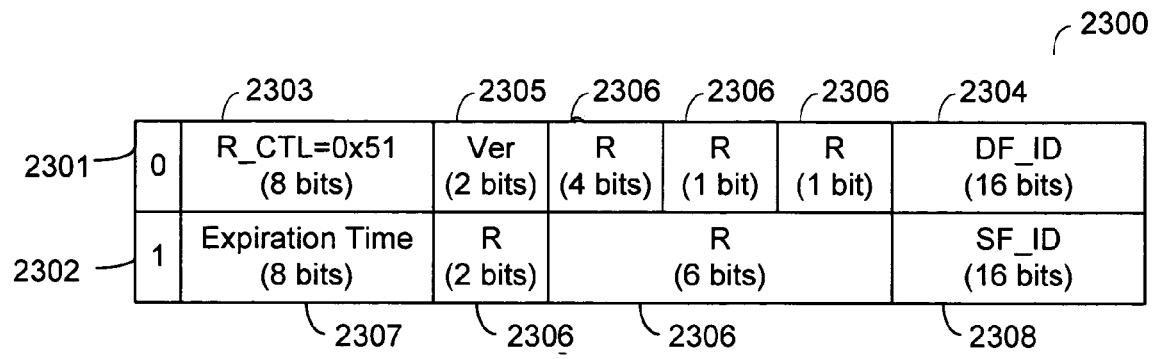
FIG. 23 illustrates one proposed layout of the fabric routing header according to the present invention.

The fabric routing header provides Fibre Channel routers 100 in the data path with useful information that is used for routing and proxy device correlation. FIG. 23 illustrates one proposed layout of the fabric routing header 2300. Fabric routing header is 64 bits in length, and is comprised of two 32 bit words 2301 and 2302. In the first field 2303 of the first word 2301 of the header (the R_CTL field), a set value of 0x51h indicates that the header is a fabric routing header. The final 16 bit field 2304 of first word 2301 is the destination fabric identification (DF_ID) field. The remaining portions of the first word comprise a Ver field, set to zero, and six reserved bits divided into three fields 2306. The second word 2302 comprises an expiration time field 2307, which can be set to zero to specify no expiration time. The final 16 bits of the second word is the source fabric identification (SF_ID) field 2308. The SFID field is used by the egress port, in conjunction with the SID field in the normal Fibre Channel frame header to derive the source proxy ID to use when sending the frame into the destination edge fabric. The remaining 8 bits of the second word are reserved and are divided into two fields 2306.

The encapsulation header is used to encapsulate the Fibre Channel frame sent from the source device to the destination device as well as encapsulating the global header. The encapsulation header is formatted exactly like a normal Fibre Channel header to facilitate transporting inter fabric frames through legacy fabrics with legacy switches. Because frames are sent from NR_Port to NR_Port across a backbone fabric, the addressing in the header (SID/DID) represents the source NR_Port and destination NR_Port. Details on the encapsulation header are illustrated in FIG. 24.

Encapsulation header 2400 comprises six words 2401-06. First word 2401 contains two fields, first field R_CTL is set to 0x04, indicating that the frame contains unsolicited data. The second field of word 2401 is the destination identifier (DID), which is set to the port identifier of the destination NR_Port. The second word 2402 is also divided into two fields. The first, CS_CTL, is copied from the original frame header. The second field of the second word is the source identifier, i.e., the Port ID of the source EX_Port. The third word 2403 is also divided into two fields, the first of which is a type field. Preferably this field is set to a particular value, e.g. 0x59, to indicate that the frame is part of an "encapsulation tunnel." The second field of word 2403 is F_CTL, which is copied from the original header.

The fourth word 2404 of encapsulation header 2400 includes three fields. The three fields, SEQ_ID, DF_CTL, and SEQ_CNT, are copied from the original Fibre Channel header. The fifth word 2405 also includes two fields, OX_ID and RX_ID, which are also copied from the original Fibre Channel header. Finally, the sixth word 2406 includes a single field, Parameter, which is also copied from the original Fibre Channel header.

Figure 24:
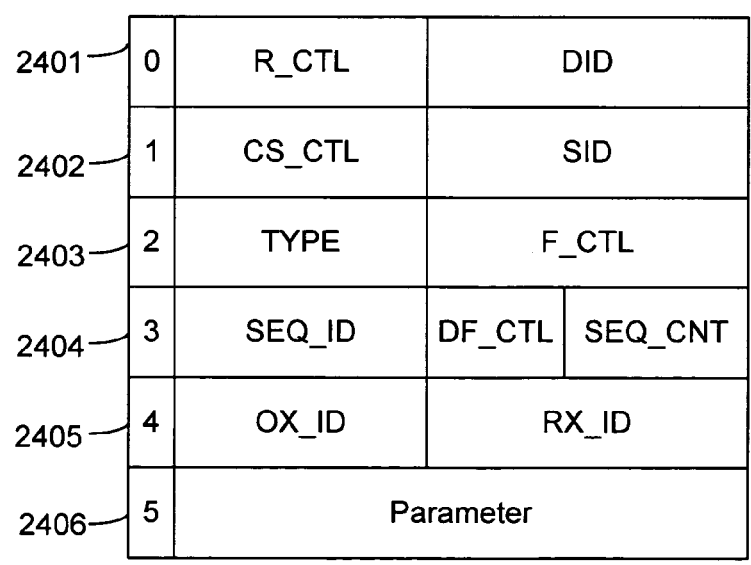
FIG. 24 illustrates an encapsulation header according to the present invention.

The normal Fibre Channel header format is also illustrated in FIG. 24 (as noted above, the format of the encapsulation header is identical to the format of a normal Fibre Channel header. A version of a normal header is provided in the frame as well. This header contains the true or local SID and the DID values of the devices and the remaining fields are copied from the original normal header received by the EX_port.

The following describes the contents of these fields at key locations in the data path as a frame moves from a source in a first fabric to a destination in a second fabric wherein the two fabrics are connected via a backbone fabric. An example of such a path can be envisioned with reference to FIG. 9, in which a frame originating at host 104 destined for storage device 108 passes through fabric A 102A to Fibre Channel router A 100A, into the backbone fabric 150. From the backbone fabric 150, the frame enters second Fibre Channel router B 100B and passes into fabric B 102B ultimately arriving at destination storage device 108.

As the frame leaves host 104, it passes through fabric A 102A to an EX_Port of Fibre Channel router A 100A. At the ingress to Fibre Channel router A 100A, the relevant fields of the Fibre Channel Header are as follows: DID is the Port ID of phantom device 108: the proxy device that represents storage device 108 in fabric A 102A. This is a valid port ID in Fabric A. SID is the Port ID of the physical source device, i.e., host 104. This is the valid, true or local ID host 104 in Fabric A. The Fibre Channel router A 100A does not utilize any other fields at this stage. The frame is passed by Fibre Channel route A 100A in the backbone fabric 150

In backbone fabric 150, the normal encapsulation header indicates the source and destination NR_ports and is used by any switches in the backbone 150 for normal routing. The next header in the frame is the fabric routing header, which contains the source and destination fabric IDs. The final header in the frame is a copy of the original normal header with one modification. While originally the DID was the proxy device, in this use the true or local DID value is used so that the header contains the true DID and SID values for each end device.

After traversing the backbone fabric 150, the frame arrives at Fibre Channel router B 100B, which removes the encapsulation and fabric routing headers and provides a new header as it passes the frame into fabric B 102B. The final header is retrieved from the frame to form the new header and the proxy SID value replaces the true SID value. The DID remains unchanged from its previous state, and thus this field continues to contain the Port ID of the physical destination device (storage device 108) in fabric B 102B). The SID is modified by Fibre Channel router B 100B to the Port ID of the proxy source device 104, i.e., the representation of host 104 as it appears in fabric B 102B. This is a valid Port ID in Fabric B 102B. No other fields are used at this stage.

Thus it has been shown that a Fibre Channel router has been developed which allows interconnection of separate Fibre Channel fabrics without requiring that the fabrics merge. The Fibre Channel router uses an EX_Port to connect to an edge fabric, the EX_Port having properties that it is included in the fabric but the router itself is not merged into the fabric. The Fibre Channel router provides proxy devices and domains to allow nodes on edge fabrics to address remote nodes as though they were on the edge fabric. The Fibre Channel router handles any necessary conversions. Part of this task includes adding various headers, including global, used to provide network wide addressing by identifying source and destination fabrics; interfabric headers, used to provide simplified addressing of the various Fibre Channel router ports connected to the edge fabrics; and encapsulation headers, used to allow legacy switches to route the frames through a backbone fabric which can connect two Fibre Channel routers. Interfabric zoning is accomplished by designating a special zoning prefix of LSAN used in naming zones. Each Fibre Channel router exchanges these LSAN zones and imports or exports devices according to intersections of the zones. These various elements allow development of larger SANs and allow simplified operation of those SANs.

While illustrative embodiments of the invention have been illustrated and described, it will be appreciated that various changes can be made therein without departing from the spirit and the scope of the invention.

What is claimed is:

1. A switching device comprising:
a first ingress module configured to be connected to a first network and further configured to:
receive a first packet from a first device in the first network,
change a destination address of the received first packet from a first phantom address corresponding to a second device in the first network, the phantom address being valid only in the first network, to an identifier of the second device valid only in a second network, wherein the second device is located in the second network and wherein the second network is coupled to the first network by a backbone network, and
encapsulate the received first packet within an encapsulation packet such that the payload of the encapsulation packet comprises the received first packet, wherein the encapsulation packet is of the same protocol as the received first packet;
a first egress module configured to be connected to the backbone network and further configured to:
receive the encapsulation packet from the ingress module, and
pass the encapsulation packet to the backbone network;
a second ingress module configured to be connected to the backbone network and further configured to:
receive from the backbone network a second encapsulation packet having as a payload a second packet, wherein the second encapsulation packet is of the same protocol as the second packet,
recover the second packet from the encapsulation packet, and
change a source identifier of the recovered second packet from an identifier of the second device in the second network, wherein the identifier of the second device in the second network is valid only in the second network to a phantom address in the first network of the second device, wherein the phantom address is valid only in the first network; and
a second egress module configured to be connected to the first network and configured to receive the recovered second packet from the ingress module and pass the recovered second packet to the first device.

2. The switching device of claim 1 wherein the first ingress module and the second egress module are coupled to a first common physical port of the switching device and wherein the second ingress module and the first egress module are coupled to a second common physical port of the switching device.

3. The switching device of claim 1 wherein:
the first, second, and backbone networks are Fibre Channel fabrics, the packets are Fibre Channel packets, and the first ingress module encapsulates the first received Fibre Channel packet within an encapsulation packet at least by adding an encapsulation header to the first received Fibre Channel packet.

4. The switching device of claim 3 wherein the first ingress module encapsulates the first received Fibre Channel packet within an encapsulation packet by further adding a fabric routing header to the first received Fibre Channel packet.

5. The switching device of claim 1 wherein:

the first, second, and backbone networks are Fibre Channel fabrics, the packets are Fibre Channel packets, and the switching device recovers the second Fibre Channel packet from the encapsulation packet at least by stripping an encapsulation header from the encapsulation packet.

6. The switching device of claim 5 wherein the switching device recovers the second Fibre Channel packet from the encapsulation packet by further stripping a fabric routing header from the encapsulation packet.

7. The switching device of claim 6 wherein the phantom address in the second fabric of the first device is derived at least in part from information contained in the fabric routing header.

8. A method comprising:

receiving a first packet from a first device in the first network, changing a destination address of the received first packet from a first phantom address corresponding to a second device in the first network, the phantom address being valid only in the first network, to an identifier of the second device valid only in a second network, wherein the second device is located in the second network and wherein the second network is coupled to the first network by a backbone network, encapsulating the received first packet within an encapsulation packet such that the payload of the encapsulation packet comprises the received first packet, wherein the encapsulation packet is of the same protocol as the received first packet, and passing the encapsulation packet to the backbone network; and receiving from the backbone network a second encapsulation packet having as a payload a second packet, wherein the second encapsulation packet is of the same protocol as the second packet, recovering the second packet from the encapsulation packet, and changing a source identifier of the recovered second packet from an identifier of the second device in the second network, wherein the identifier of the second device in the second network is valid only in the second network to a phantom address in the first network of the second device, wherein the phantom address is valid only in the first network; and passing the recovered second packet to the second device.

9. The method of claim 8 wherein:

the first, second, and backbone networks are Fibre Channel fabrics, the packets are Fibre Channel packets, and encapsulating the received first Fibre Channel packet comprises adding an encapsulation header and a fabric routing header to the received first Fibre Channel packet.

10. The method of claim 8 wherein:

the first, second, and backbone networks are Fibre Channel fabrics, the packets are Fibre Channel packets, and recovering the second Fibre Channel packet from the second encapsulation packet comprises stripping an encapsulation header and a fabric routing header from the second encapsulation packet; and changing the source identifier of the recovered second Fibre Channel packet further comprises deriving the phantom address from information contained in the fabric routing header.

* * * * *

UNITED STATES PATENT AND TRADEMARK OFFICE
CERTIFICATE OF CORRECTION

| | | |
|---|---|---|
| PATENT NO. | : 8,532,119 B2 | Page 1 of 1 |
| APPLICATION NO. | : 10/903899 | |
| DATED | : September 10, 2013 | |
| INVENTOR(S) | : Snively et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1640 days.

Signed and Sealed this
Twenty-fourth Day of February, 2015

Michelle K. Lee
*Deputy Director of the United States Patent and Trademark Office*